(12) United States Patent
Hayakawa et al.

(10) Patent No.: US 6,742,087 B2
(45) Date of Patent: May 25, 2004

(54) CONTROL OF ACCESS BY MULTIPLE DATA PROCESSING UNITS TO MULTIPLE MEMORIES

(75) Inventors: Hiroshi Hayakawa, Nagoya (JP); Hideaki Ishihara, Okazaki (JP)

(73) Assignee: Denso Corporation, Kariya (JP)

( * ) Notice: Subject to any disclaimer, the term of this patent is extended or adjusted under 35 U.S.C. 154(b) by 189 days.

(21) Appl. No.: 09/858,908

(22) Filed: May 17, 2001

(65) Prior Publication Data

US 2002/0004888 A1 Jan. 10, 2002

(30) Foreign Application Priority Data

May 18, 2000 (JP) ........................................ 2000-146528

(51) Int. Cl.[7] .............................................. G06F 12/00
(52) U.S. Cl. ........................ 711/148; 711/154; 710/127
(58) Field of Search ................................ 711/148, 147, 711/154; 710/127, 126

(56) References Cited

U.S. PATENT DOCUMENTS 5,307,469 A * 4/1994 Mann ............................. 711/5

FOREIGN PATENT DOCUMENTS

| JP | A-2-91744 | 3/1990 |
|---|---|---|
| JP | A-3-75959 | 3/1991 |
| JP | A-4-133142 | 5/1992 |
| JP | A-5-189297 | 7/1993 |
| JP | A-5-257903 | 10/1993 |
| JP | A-5-289987 | 11/1993 |

* cited by examiner

*Primary Examiner*—Kimberly McLean-Mayo
(74) *Attorney, Agent, or Firm*—Posz & Bethards, PLC

(57) ABSTRACT

When a data read request is made at a long unit (two words) in a data processing system including a plurality of data processing unit, a control unit, a plurality (for example, two) of memory devices, data is simultaneously read from both memory devices. While certain data is supplied to the requesting data processing unit, other data is stored in a register. At the next timing, the other data is supplied to the data processing unit from the register. In storing, one word data is stored in a register. At the next timing, this word data and the following word data is stored in memory devices, respectively, at the same time. Pre-loading data and priority changing operations reduce the occurrence of access collision.

3 Claims, 20 Drawing Sheets

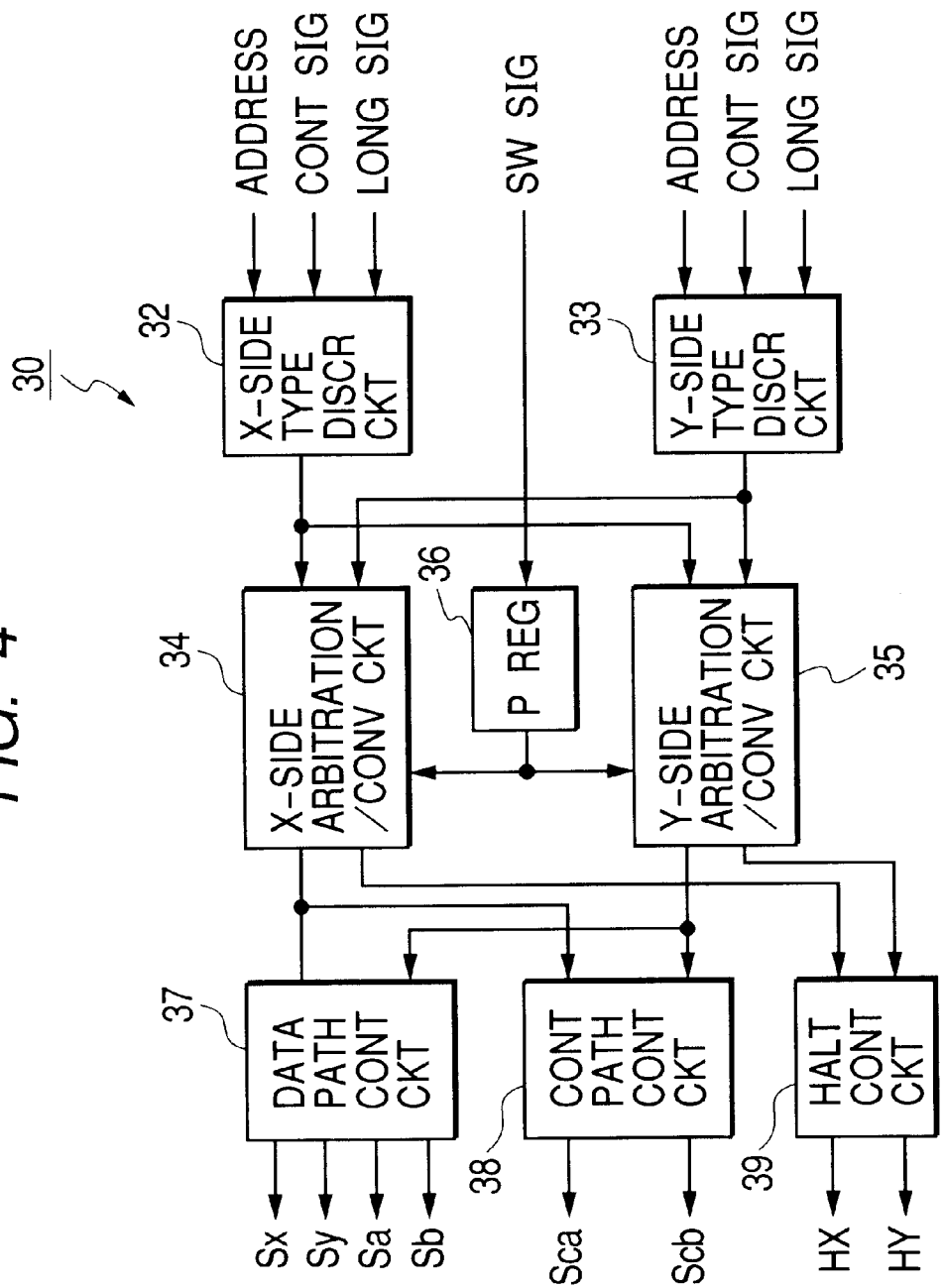

FIG. 5A

| X/Y SIDE DATA PROC UNIT | PATH CONT SIG FOR CONT PATH CKT | |
|---|---|---|
| | Sca | Scb |
| A-SIDE W ACCESS | X/Y | — |
| B-SIDE W ACCESS | — | X/Y |
| L ACCESS | X/Y | X/Y |
| R ACCESS | — | — |
| NO ACCESS | — | — |

X : SEL CONT BUS CX      Y : SEL CONT BUS CY

FIG. 5B

| | | PATH CONT SIG FOR READING PATH CKT | | | |
|---|---|---|---|---|---|
| | | Sx | | Sy | |
| | | OUTPUT | HOLD | OUTPUT | HOLD |
| X-SIDE DATA PROC UNIT | A/B-SIDE W READ | A/B | — | — | |
| | A/B-SIDE L READ | A/B | B/A | | |
| | R READ | C | — | | |
| | NO ACCESS | — | — | | |
| Y-SIDE DATA PROC UNIT | A/B-SIDE W READ | | | A/B | — |
| | A/B-SIDE L READ | — | | A/B | B/A |
| | R READ | | | C | — |
| | NO ACCESS | | | — | — |

A : SEL DATA BUS DA      B : SEL DATA BUS DB
C : SEL READING TEMPORARY REG

FIG. 5C

| X/Y-SIDE DATA PROC UNIT | PATH CONT SIG FOR STORING PATH CKT | | | |
|---|---|---|---|---|
| | Sa | | Sb | |
| A-SIDE W STORE | X/Y | — | — | — |
| B-SIDE W STORE | — | — | X/Y | — |
| A-SIDE R STORE | — | X/Y | — | — |
| B-SIDE R STORE | — | — | — | X/Y |
| A-SIDE L STORE | Z | — | X/Y | — |
| B-SIDE L STORE | X/Y | — | Z | — |
| NO ACCESS | — | — | — | — |

X : SEL DATA BUS DX      Y : SEL DATA BUS DY
Z : SEL WRITING WORK REG

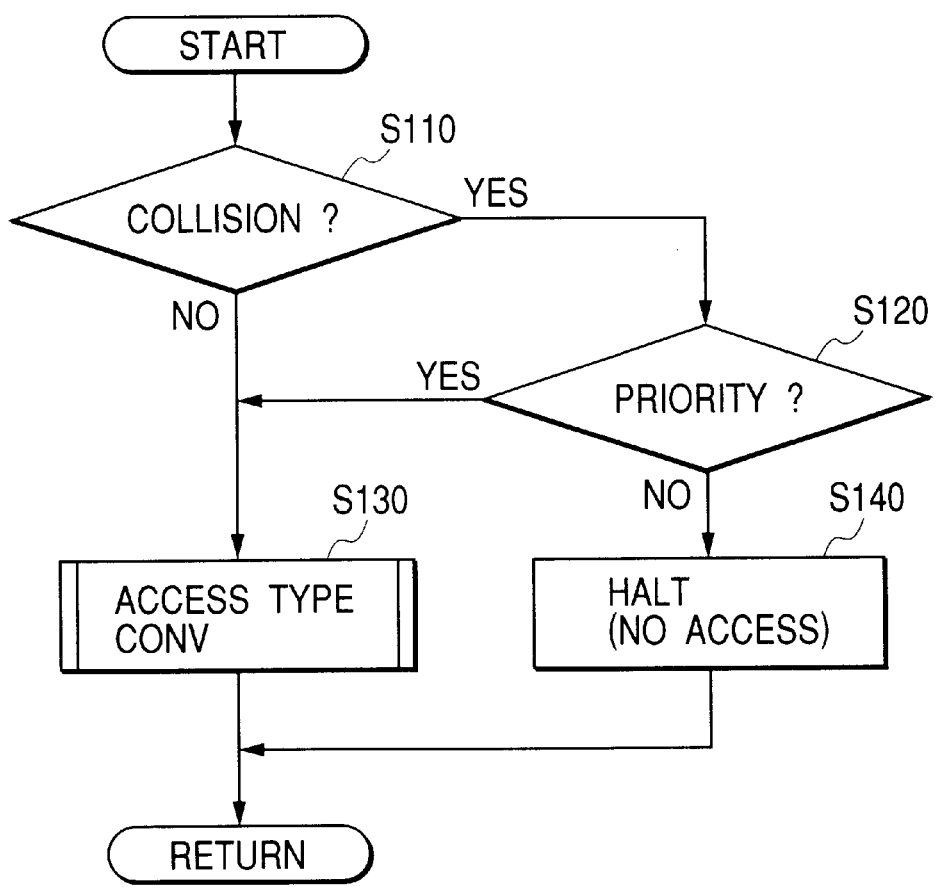

FIG. 7A

COLLISION JUDGING TB

| SUBJECT DATA PROC UNIT \ OPP SIDE DATA PROC UNIT | WORD ACCESS | | | | LONG ACCESS | | | |
|---|---|---|---|---|---|---|---|---|
| | W READ A-SIDE | W STORE A-SIDE | W READ B-SIDE | W STORE B-SIDE | L READ (FIRST) | L READ (SECOND) | L STORE (FIRST) | L STORE (SECOND) |
| WORD ACCESS — A-SIDE W READ | × | ○ | | | × | ○ | ○ | × |
| WORD ACCESS — A-SIDE W STORE | ○ | × | | | ○ | ○ | × | × |
| WORD ACCESS — B-SIDE W READ | | | × | ○ | ○ | — | ○ | ○ |
| WORD ACCESS — B-SIDE W STORE | | | ○ | × | ○ | ○ | ○ | — |
| LONG ACCESS — L READ (FIRST) | × | ○ | ○ | ○ | | | | |
| LONG ACCESS — L READ (SECOND) | ○ | ○ | — | ○ | | | | |
| LONG ACCESS — L STORE (FIRST) | ○ | × | ○ | ○ | | | | |
| LONG ACCESS — L STORE (SECOND) | × | × | ○ | — | | | | |

○ : NO ACCESS COLLISION  × : COLLISION  — : NO CASE

FIG. 7B

TYPE CONV TABLE

| DISCRIMINATED ACCESS TYPE | ACTUAL ACCESS TYPE | REMARKS |
|---|---|---|
| A-SIDE W READ | A-SIDE W READ | |
| A-SIDE W STORE | A-SIDE W STORE | |
| B-SIDE W READ | B-SIDE W READ | |
| B-SIDE W STORE | B-SIDE W STORE | |
| FIRST L READ | A-SIDE L READ | IF TOP ADDRESS IS A-SIDE |
| | B-SIDE L READ | IF TOP ADDRESS IS B-SIDE |
| SECOND L READ | R READ | NO COLLISION |
| FIRST L STORE | A-SIDE R STORE | IF TOP ADDRESS IS A-SIDE |
| | B-SIDE R STORE | IF TOP ADDRESS IS B-SIDE |
| SECOND L STORE | A-SIDE L STORE | IF TOP ADDRESS IS A-SIDE |
| | B-SIDE L STORE | IF TOP ADDRESS IS B-SIDE |

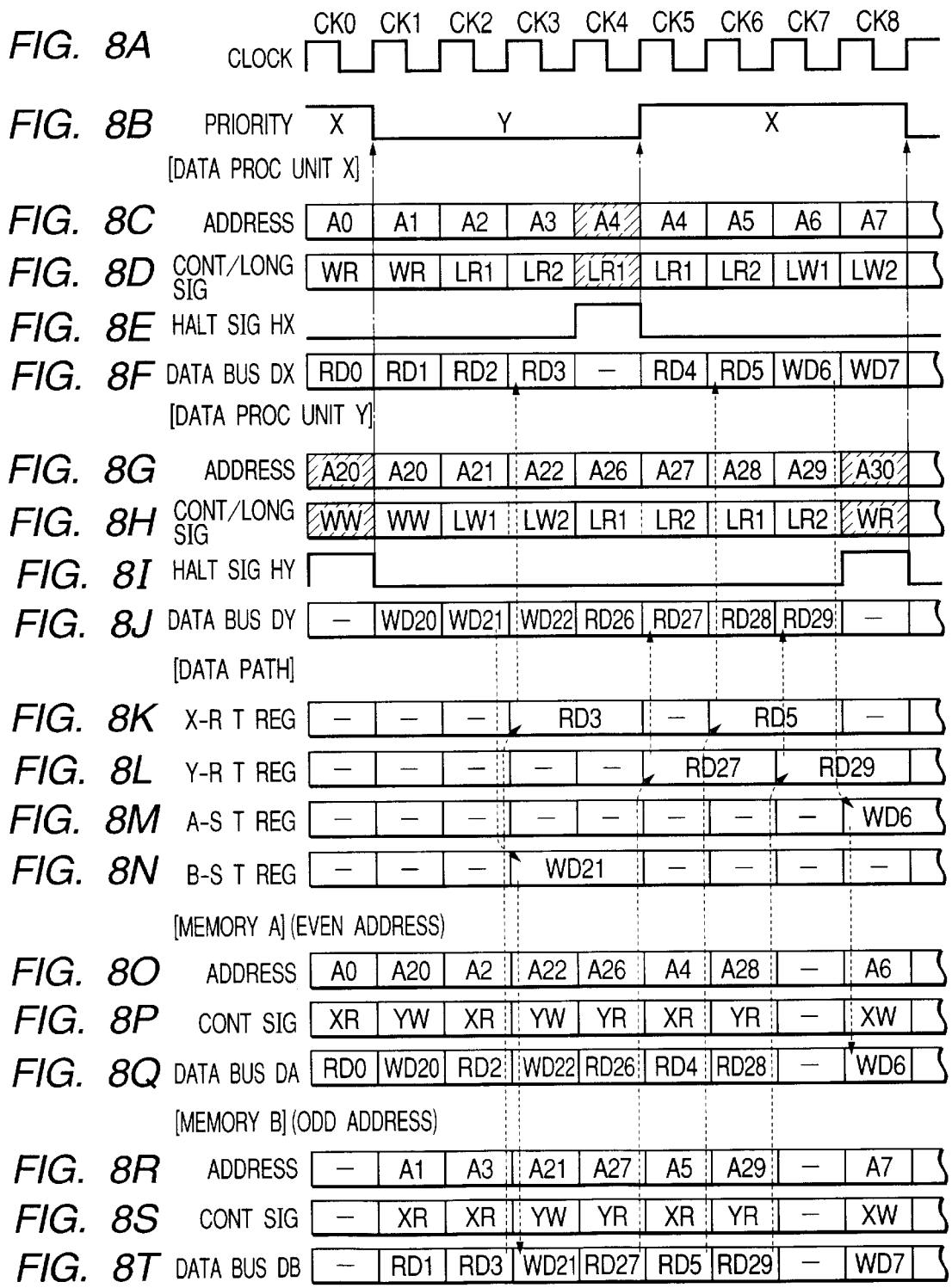

(CLK CK0)

(CLK CK1)

(CLK CK2)

(CLK CK3)

(CLK CK4)

(CLK CK5)

(CLK CK6)

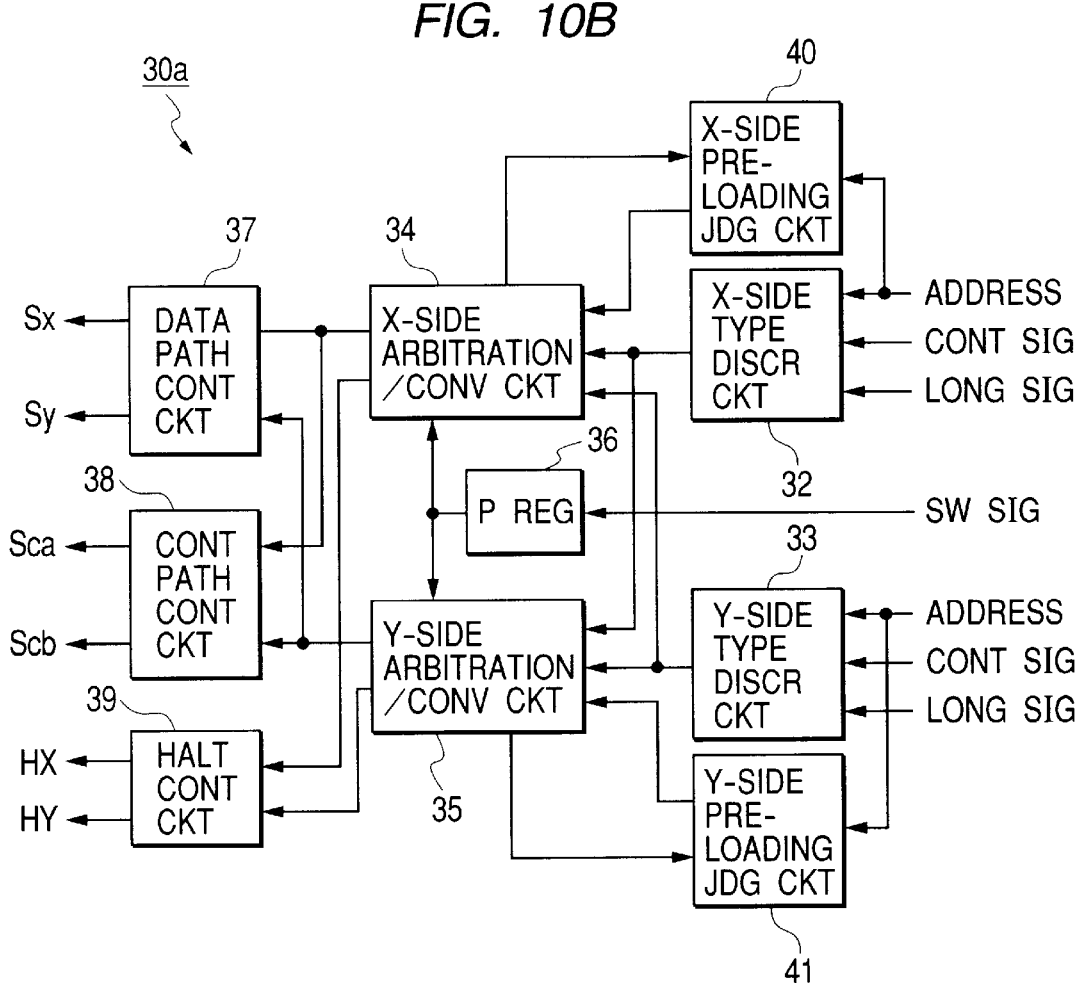

TYPE CONV TB

| DISCR ACCESS TYPE | ACTUAL ACCESS TYPE | REMARKS |
|---|---|---|
| A-SIDE W RD NO PRE-LOADING | A-SIDE W RD A-SIDE L RD | REFFER FLOW CHART |
| B-SIDE W RD PRE-LOADING | B-SIDE W RD B-SIDE L RD | |
| W RD PRE-LOADING | R RD | — |
| 1ST L RD | A-SIDE L RD B-SIDE L RD | WHEN TOP ADDR ON A SIDE WHEN TOP ADDR ON B SIDE |
| 2ND L RD | R RD | (NO COLLISION) |

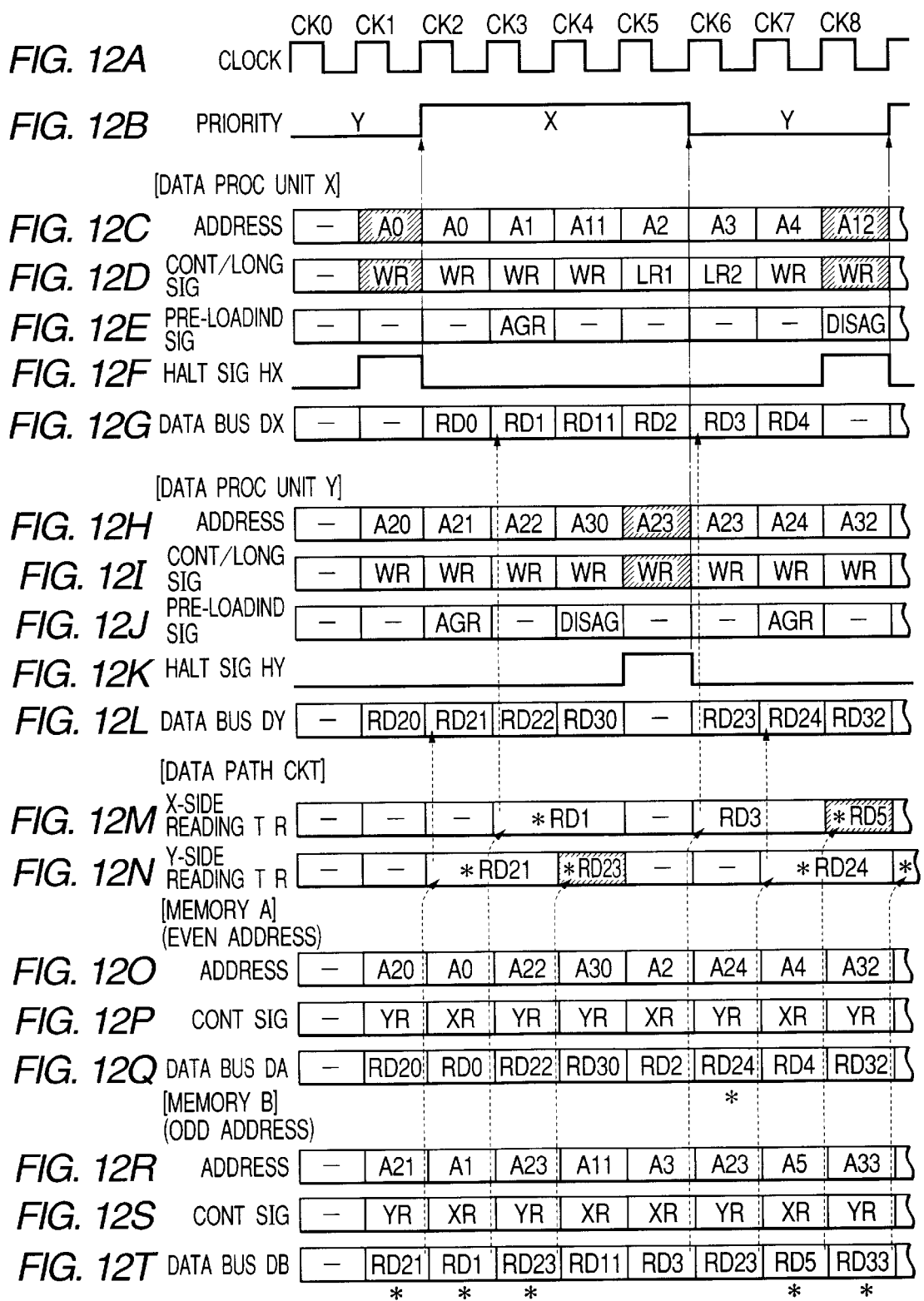

(CLK CK1)

(CLK CK2)

(CLK CK3)

(CLK CK4)

| COLLISION JDG TB | Y-SIDE UNIT | |
| --- | --- | --- |
| | A-SIDE ACCESS | B-SIDE ACCESS |
| X-SIDE UNIT — A-SIDE ACCESS | × | ○ |
| X-SIDE UNIT — A-SIDE ACCESS | ○ | × |

○: NO COLLISION  ×: COLLISION

CONTROL OF ACCESS BY MULTIPLE DATA PROCESSING UNITS TO MULTIPLE MEMORIES

BACKGROUND OF THE INVENTION

1. Field of the Invention

This invention relates to a method of controlling access to independently controllable memory units commonly shared by data processing units and an access controlling unit including independently controllable memory units commonly shared by data processing units.

2. Description of the Prior Art

An access controlling unit controlling access from a data processing unit to a memory unit in another data processing unit coupled to the data processing unit through a buffer is known. Such a prior method is disclosed in Japanese patent application provisional publication No.5-289987. Another access controlling unit controlling access to a resource commonly shared by data processing units through a common bus and buffers provided to data processing unit is known. Such a prior art access controlling unit is disclosed in Japanese patent application provisional publication No. 3-75959. In this prior art access controlling unit, the data processing unit that has obtained the right to use the common bus can access the shared resource.

In the case of the former access controlling unit, when one data processing unit accesses the shared memory unit, another data processing unit is stopped. Thus, if access to the shared memory unit is frequent, the processing efficiency will decrease.

In the case of the latter access controlling unit, either of the data processing units is stopped only when both data processing units require the common bus at the same time. Thus, the processing efficiency is higher than that of the former data processing unit. However, if it is assumed that there is more than one common resource, though both data processing units access different resources at the same time, the data processing unit without the right to use the common bus is stopped.

In the case of the latter access controlling unit, either of data processing unit is stopped only when both data processing unit require the right of using the common bus at the same time. Thus, the processing efficiency is higher than that of the former data processing unit. However, if it is assumed that there are more than one common resources. Though both data processing units access to different resources at the same time, the data processing unit without right of using the common bus is stopped.

Still another prior art access controlling unit coupled to memory units and data processing unit is known, wherein different data processing units can access different memory units, respectively. FIG. 15 is a block diagram of such a prior art access controlling unit. A control unit 100 for coupling data busses DX and DY from two data processing units X and Y to data buses DA and DB from two memory units A and B is provided as the access controlling unit.

In this example, the data buses DX, DY, DA, and DB have the same bus width (sixteen bits), and the memory units A and B have continuously changing addresses, respectively.

The control unit 100 includes a data path control circuit 110. The data path control circuit 110 includes an X-side loading path unit 111 for coupling either of the data bus DA or DB to the data bus DX in response to the path control signal Sx, a Y-side loading path unit 112 for coupling either of the data bus DA or DB to the data bus DY in response to the path control signal Sy, an A-side storing path unit 113 for coupling either of the data bus OX or DY to the data bus DA in response to the path control signal Sa, and a Y-side storing path unit 114 for coupling either of the data bus DX or DY to the data bus DB in response to the path control signal Sb.

Here, each of the path units 111 to 114 includes a gate circuit having a ti-state buffer, so that turning on the gate circuit enables loading and storing in each of path units 111 to 114. The control unit 100 further includes a control circuit (not shown) for generating the path control signals Sx, Sy, Sa, and Sb in accordance with address signals and various control signals outputted by the data processing units X and Y.

The control circuit discriminates access from each of the data processing units X and Y among to-A-side access, to-B-side access, and no access on the basis of the address, and various control signals from the data processing units X and Y. Next, the control circuit effects the arbitration process for every data processing unit as shown by a flow chart as shown in FIG. 16A.

Here, the data processing units operate synchronously with each other and execute one process at every processing cycle, for example, one clock cycle. Thus, it is assumed that the arbitration process mentioned below is executed at every processing cycle.

When the arbitration process is activated, the control circuit judges whether there is no access in step S510. If there is no access in step S510, processing ends. If there is access, the control circuit judges whether there is collision in step S520. If there is no collision, the control circuit permits the access in step S540.

Comparing the destinations of accesses from the data processing units X and Y provides this judgment. If the destinations are the same, there is collision as shown by the table in FIG. 16B.

If there is collision, the control circuit judges which access has higher priority in step S530. The control circuit permits the access from the data processing unit having a higher priority and inhibits the access from the data processing unit having a low priority in steps S540 and S550.

SUMMARY OF THE INVENTION

The aim of the present invention is to provide a superior method of controlling access to memory units and a superior access controlling unit.

According to the present invention, a first aspect of the present invention provides a method of controlling access to a memory device commonly shared by a plurality of data processing units, said memory device including $2^M$ memory units (M being a natural number) which are independently controllable and have the same data bus width as said data processing units, comprising steps of: (a) assigning addresses to each of said memory units such that addresses in each of said memory units change in the same manner as other memory units and corresponding addresses in said memory units vary in accordance with arrangement of said memory units in said memory device; (b) when one of said data processing units requests to read data in said memory device at a data size which is $2^k$ times said data bus width ($1 \leq k \leq M$ and k being a natural number), reading (loading) said data from the corresponding $2^k$ memory units at the same time; and (c) independently supplying each of data from said corresponding $2^k$ memory units $2^k$ times to said one of said data processing units.

According to the present invention, a second aspect of the present invention provides a method based on the first aspect, wherein in step (b), when said one of said data processing unit requests reading (loading) desired data at a desired address at a data size which is $2^P$ times said data bus width ($0 \leq p \leq M-1$ and p being a natural number), and if any other data processing unit does not request access to said memory device, reading (loading) another data at an address following to said desired address from data processing units other than said one of said data processing units and storing other data in a temporary register as pre-loading data; and after supplying said desired data to said one of said data processing units, when said one of data processing unit requests reading (loading) with an address agreeing with said address, supplying said other data from said temporary register to said one of said data processing units.

According to the present invention, a third aspect of the present invention provides a method based on the second aspect, wherein, when said desired data is other than an instruction for executing a predetermined process in said one of said data processing units, inhibiting reading of said other data.

According to the present invention, a third aspect of the present invention provides a method based on the first aspect, further comprising the steps of: (d) when one of said data processing units requests to store data in said memory device at a data size which is $2^k$ times said data bus width, independently supplying each portion of said data from said one of said data processing unit $2^k$ times and then, storing all portions of said data in the corresponding $2^K$ memory units at the same time.

According to the present invention, a fifth aspect of the present invention provides a method of controlling access to a memory device commonly shared by a plurality of data processing units, said memory device including $2^M$ memory units (M being a natural number) which are independently controllable and have the same data bus width as said data processing units, comprising steps of: (a) assigning addresses to each of said memory units such that addresses in each of said memory units change in the same manner as other memory units and corresponding addresses in said data processing units vary in accordance with arrangement of said memory units in said memory device; (b) when one of said data processing units requests to store data in said memory device at a data size which is $2^k$ times said data bus width ($1 \leq k \leq M$ and k being a natural number); and (c) independently supplying each portion of said data from said one of said data processing units $2^k$ times and then-, storing all portions of said data in the corresponding $2^k$ memory units at the same time.

According to the present invention, a sixth aspect of the present invention provides an access control unit, coupled to a plurality of data processing units and a memory device including $2^M$ memory units which are independently controllable and have the same data bus width as said data processing units (M being natural number), for controlling access from said data processing units to said memory device, addresses in each of said memory units being defined such that said addresses in each of said memory units change in the same manner as other memory units and corresponding addresses in said memory units vary in accordance with arrangement of said memory units in said memory device, said access control unit comprising: reading (loading) temporary registers, each being provided every data processing unit for temporarily storing data read from said memory device; usual reading (loading) means responsive to a reading (loading) request for reading (loading) said data at an address indicated by said reading (loading) request and supplying said data to one of said data processing unit sending said reading (loading) request; simultaneously reading (loading) means for, when said reading (loading) request is for reading (loading) said data at a data size which is $2^k$ times said data bus width ($1 \leq k \leq M$ and k being a natural number), reading (loading) said data at addresses following to said address from the corresponding ($2^k-1$) memory units at the same time as said usual reading (loading) means reads said data and storing said data from said addresses following to said address in said reading (loading) temporary registers; and buffer reading (loading) means for successively supplying each of said data from said reading (loading) temporary registers to said one of said data processing units in response to following reading (loading) requests successively made ($2^k-1$) times after said reading (loading) request.

According to the present invention, a seventh aspect of the present invention provides an access control unit based on the sixth aspect, further comprising: pre-loading means for, when said one of said data processing unit requests access for reading (loading) desired data at a desired address at a data size which is $2^P$ times said data bus width ($0 \leq p \leq M-1$ and p being a natural number), and any other data processing unit does not request to access to said memory device, reading (loading) another data at an address following to said desired address from data processing units other than said one of said data processing units and storing another data in said reading (loading) temporary register as pre-loading data; a pre-loading address register for storing a top address of said pre-loading data; and pre-loading data supplying means for supplying said other data from said reading (loading) temporary register to said one of data processing units after supplying said desired data to said one of said data processing units, when said one of data processing units requests following reading (loading) with an address agreeing with said address.

According to the present invention, an eighth aspect of the present invention provides an access control unit based on the seventh aspect, further comprising: pre-loading inhibiting means for discriminating a type of said access requested by said one of said data processing units and inhibiting to read said other data when said access is a type other than an instruction for executing a predetermined process in said one of said data processing units.

According to the present invention, a ninth aspect of the present invention provides an access control unit based on the sixth aspect, further comprising: storing temporary registers, each being provided to every memory unit for temporarily storing said data in each of said memory units; usual storing means responsive to a storing request from one of said data processing units for directly supplying said data outputted from said one of data processing units to one of said memory units indicated by said storing request; buffer storing means for, when said storing request as a first successive storing request is for requesting storing data at a bit size which is $2^k$ times said data bus width ($1 \leq k \leq M$ and k being a natural number), storing first to $(2^k-1)^{th}$ divided data out of said data in response to said first successive storing request to $(2^k-1)^{th}$ successive storing requests; simultaneously storing means for, after said divided data has been stored in said storing temporary registers by said buffer storing means, storing said divided data outputted from said one of data processing units in the corresponding $2^k$ memory units together with said first to $(2^k-1)^{th}$ divided data stored in said storing temporary registers in response to said $(2^k)^{th}$ successive storing request.

According to the present invention, a tenth aspect of the present invention provides an access control unit based on the sixth aspect, further comprising arbitration means for, when a collision between accesses from said data processing units to the same memory unit occurs, halting a data processing unit having a lower priority.

According to the present invention, an eleventh aspect of the present invention provides an access control unit based on the tenth aspect, further comprising external priority changing means for changing priorities of said data processing units in response to external operation.

According to the present invention, a twelfth aspect of the present invention provides an access control unit based on the tenth aspect, further comprising automatic priority changing means for changing priorities of said data processing unit in accordance with a predetermined rule at each arbitration by said arbitration means.

According to the present invention, a thirteenth aspect of the present invention provides an access control unit coupled to a plurality of data processing units and a memory device including $2^M$ memory units which are independently controllable and have the same data bus width as said data processing units (M being natural number), for controlling access from said data processing unit to said memory device, addresses in each of said memory units being defined such that said addresses in each of said memory units change in the same manner as other memory units and corresponding addresses in said memory units vary in accordance with arrangement of said memory units in each memory device, said access control unit comprising: storing temporary registers, each being provided every memory unit for temporarily storing said data in each of said memory units; usual storing means responsive to a storing request from one of said data processing units for directly supplying said data outputted from said one of data processing units to one of said memory units indicated by said storing request; buffer storing means for, when said storing request as a first successive storing request is for requesting storing data at a bit size which is $2^k$ times said data bus width ($1 \leq k \leq M$ and k being a natural number), storing first to $(2^k-1)^{th}$ divided data out of said data in response to said first successive storing request to $(2^k-1)^{th}$ successive storing requests; simultaneously storing means for, after said divided data has been stored in said storing temporary registers by said buffer storing means, storing said divided data outputted from said one of data processing units in the corresponding $2^k$ memory units together with said first to $(2^k-1)^{th}$ divided data stored in said storing temporary registers in response to said $(2^k)^{th}$ successive storing request

BRIEF DESCRIPTION OF THE DRAWINGS

The object and features of the present invention will become more readily apparent from the following detailed description taken in conjunction with the accompanying drawings in which:

FIG. 4 is a block diagram of the control circuit shown in FIG. 3;

FIGS. 5A to 5C are tables for generating path control signals shown in FIG. 3;

FIG. 6 depicts a flow chart showing priority judging operation;

FIG. 7A is a table for judging access collision;

FIG. 7B is a table for access conversion;

FIGS. 8A to 8T are time charts showing operations in the control unit according to the first embodiment;

FIG. 10B is a block diagram of the control unit in the control unit according to the second embodiment;

FIG. 10C is a table for collision judgment according to the second embodiment;

FIGS. 12A to 12T are time charts according to the second embodiment;

The same or corresponding elements or parts are designated with like references throughout the drawings.

DETAILED DESCRIPTION OF THE INVENTION

[First Embodiment]

Figure 1:
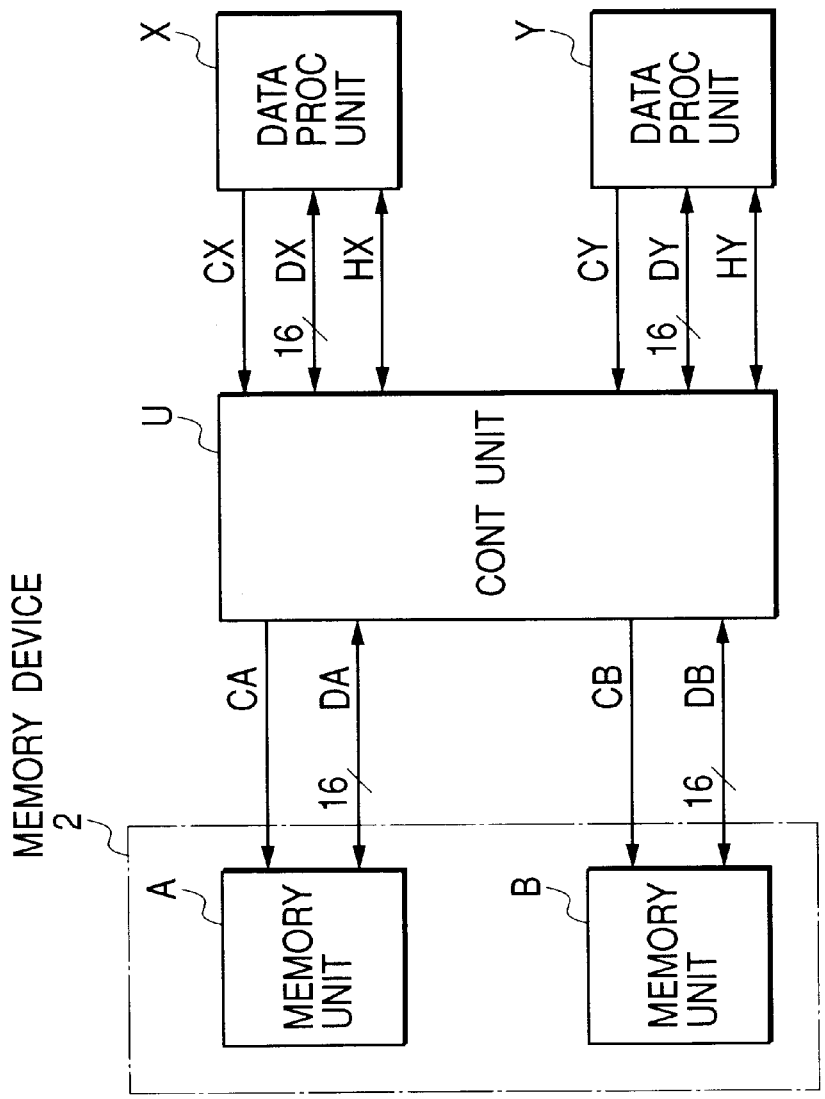
FIG. 1 is a block diagram of a computer system including an access controlling unit according to a first embodiment of this invention.

FIG. 1 is a block diagram of a computer system including an access controlling unit according to the first embodiment of this invention.

The computer system includes a memory device 2 having two memory units A and B for storing various programs and data, two data processing units X and Y commonly sharing the memory device 2, and a control unit U for controlling access from the data processing units X and Y.

Each of the memory units A and B comprises a RAM for independently storing (writing) and reading (loading) 16-bit data through the data bus DA or DB in response to addresses and control signals (a read instruction, a storing instruction, a chip select signal, etc.) supplied from the control unit U thorough the control bus CA or CB.

Figure 2A:
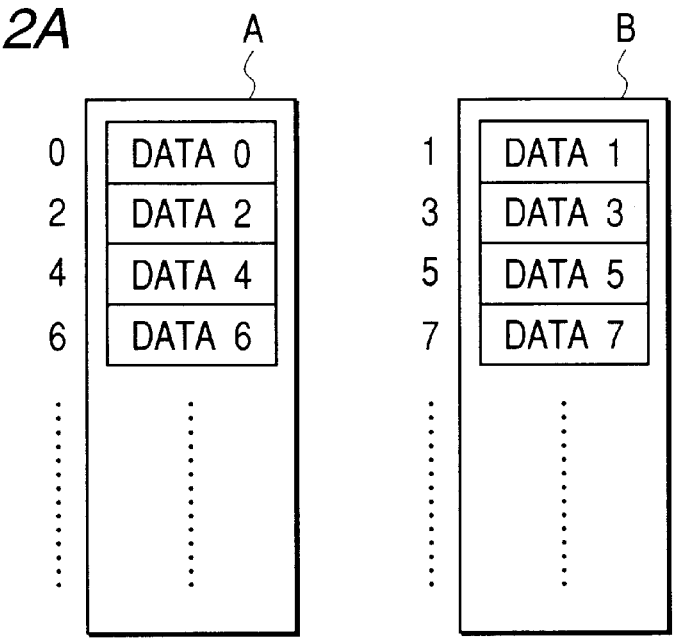
FIGS. 2A and 2B are illustrations of address arrangements according to a first embodiment.

Continuous addresses are assigned to the memory device 2, wherein even addresses out of them are assigned to the memory unit A, and odd addresses out of them are assigned to the memory unit B as shown in FIG. 2A.

Figure 2B:
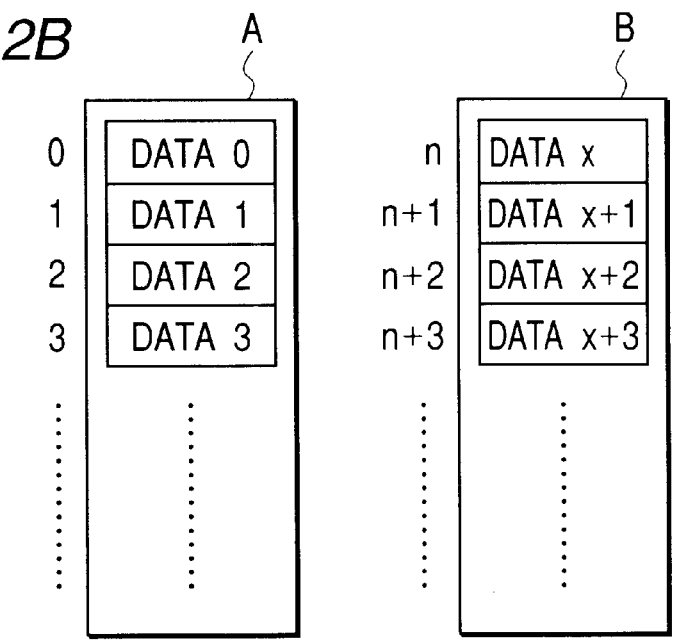

The following description is made under the assumption that address changes one by one in the access unit (the access unit is word, here). However, if the address changes one by one in byte unit (the access unit is byte), the memory unit A has addresses of ($2 \times 2$ m), and the memory unit B has addresses of $\{2 \times (2\text{ m}+1)\}$ as shown in FIG. 2B. That is, the addresses in the memory device 2 change successively, wherein the corresponding addresses (for example, top addresses) change in accordance with arrangement of memory units A and B.

Each of data processing units X and Y has 16 bits of data buses DX or CY as same as the memory units A and B and has a RISC type of processor executing one instruction every one clock. Here, each of data processing units X and Y has an internal bus of 32 bits and can deal the data in the long unit (32 bits), the byte unit (8 bits), and the word unit (16 bits). More specifically, in data transmission between each of memory units A and B and each of the data processing units, if data is transferred in the long unit, data of the upper eight bits is transferred and next data of the lower eight bits is transferred. On the other hand, in the data transmission in the byte unit, data transmission is performed in the same manner as the word unit, but the data processing unit only uses the lower byte.

Moreover, the data processing units X and Y supply addresses and control signals to the control unit U through the control buses CX and CY, respectively, and their operations are stopped when inhibit signals HX and HY supplied from the control unit U are active, respectively.

Figure 3:
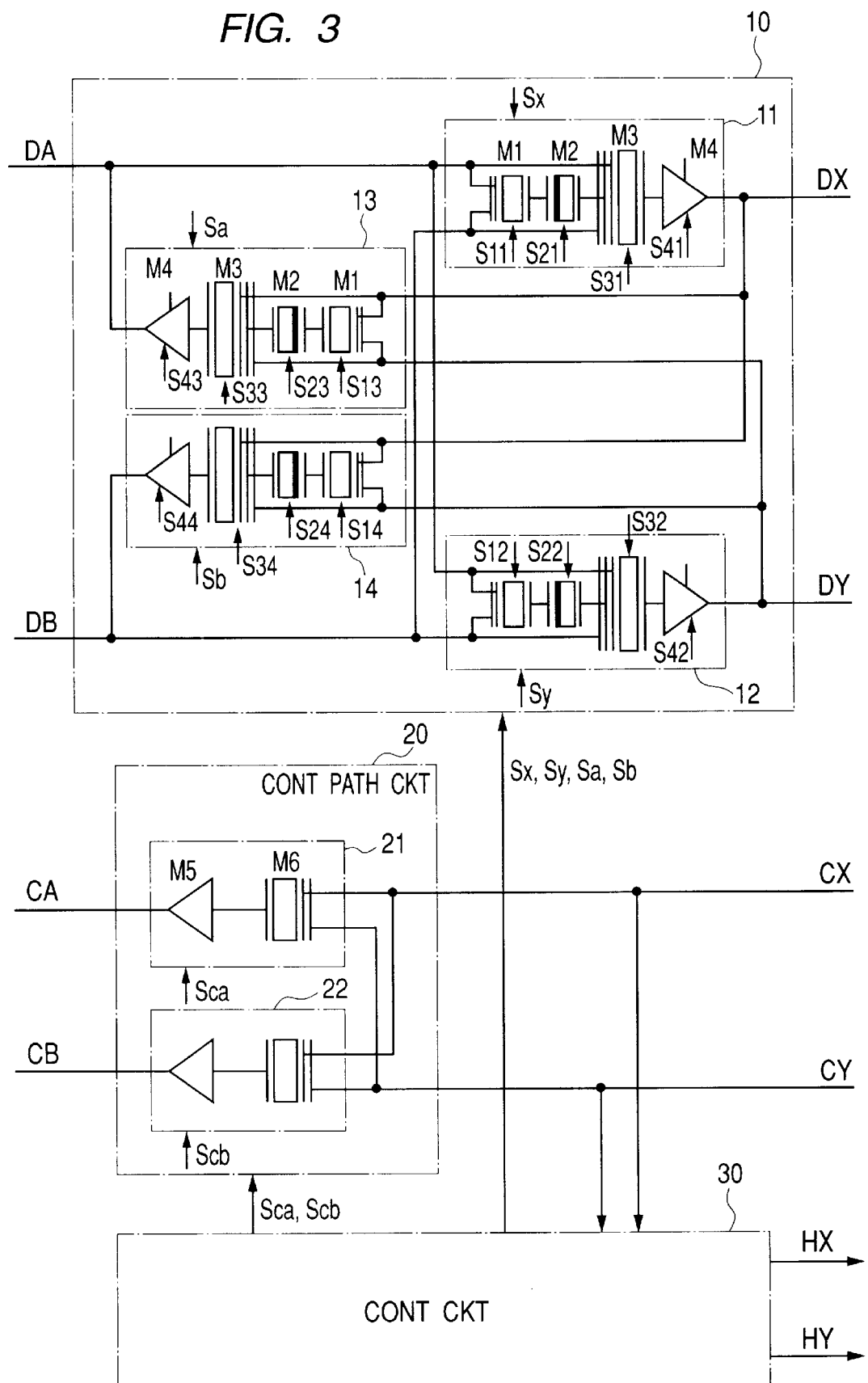
FIG. 3 is a block diagram of the control unit shown in FIG. 1.

FIG. 3 is a block diagram of the control unit U. The control unit U includes a data path circuit 10 for providing paths between the data buses DX and DY and data buses DA and DB, a control path circuit 20 for controlling forming paths between control buses CX and CY and control buses CA and CB, and a control circuit 30 for generating path controlling signals for operating the data path circuit 10 and the control path circuit 20 and inhibit signals HX and HY for the data processing units X and Y.

The data path circuit 10 includes an X-side loading (reading) data path unit 11 for providing loading (reading) data paths for supplying data read from the memory units A and B through the data buses DA and DB to the data processing unit X through the data bus DX in response to a path control signal Sx (S11, S21, S31, and S41) from the control circuit 30, a Y-side loading data path unit 12 for providing loading data paths for supplying the data read from the memory units A and B through the data buses DA and DB to the data processing unit Y through the data bus DY in response to the path control signal Sy (S12, S22, D32, and S42) from the control circuit 30, an A-side storing (writing) path unit 13 for providing storing (writing) paths for supplying storing data from the data processing units X and Y through the data buses DX and DY to the memory unit A through the data bus DA in response to the path control signal Sa (S13, S 23, S33, and S43) from the control circuit 30, and a B-side storing path unit 14 for supplying storing data from the data processing units X and Y through the data buses DX and DY to the memory unit B through the data bus DB in response to the path control signal Sb (S14, S 24, S34, and S44) from the control circuit 30.

Each of the path units 11 to 14 has the same structure and has a selection circuit M1 for selecting one of a pair of input data buses in response to each of selection signals S11 to S14, a temporary register M2 for storing the output of the selection circuit M1 at the timing indicated by each of latch signals S21 to S24, a selection circuit M3 for selecting one of data on a pair of input data buses and an output of the temporary register M2 in response to each of selection signals S31 to S34, and a tri-state gate circuit M4 for connecting and disconnecting an output of the selection circuit M3 to or from the output data bus.

Here, in the X-side loading data path unit 11, the data buses DA and DB act as input data buses and data bus DX acts as output data bus. In the Y-side loading data path unit 12, the data buses DA and DB act as input data buses, the data bus DY act as an output data bus. In the A-side storing path unit 13, the data buses DX and DY act as input data buses, and the data bus DA acts as an output data bus. In the B-side storing pithy circuit 14, the data buses DX and DY act as input data buses, and the data bus DB acts as an output data bus.

Moreover, out of the temporary registers M2 in the path units 11 to 14, one in the X-side loading data path unit 11 and one in the Y-side loading data path unit 12 act as reading (loading) temporary registers. The temporary registers M2 in the A-side storing path units 13 and that in the B-side storing path unit 14 act as storing temporary registers.

The control path circuit 20 includes an A-side control path unit 21 for forming a control path for supplying address signals and control signals supplied from the data processing units X and Y through the control buses CX and CY, in accordance with the path control signal Sca from the control circuit 30, and a B-side control path unit 22 for forming a control path for supplying address signals and control signals supplied from the data processing units X and Y through the control buses CX and CY in accordance with the path control signal Scb from the control circuit 30.

The A-side control path unit 21 (B-side control path unit 22) includes a selection circuit M6 for selecting either of the control bus CX or CY in accordance with a path control signal Sca (path control signal Scb), a buffer circuit M5 connected between the output of the selection circuit M6 and the control bus CA (control bus CB). Here, the description in the parentheses represents the structure of the B-side control path unit 22.

Moreover, out of the selection circuits M6 in the both control path units 21 and 22, the selection circuit M6 in the A-side control path unit 21 outputs an address of an even number by adding one to the odd address, when the address on one of the control buses CX and CY that is selected by the selection circuit M6 in the control path unit 21 is odd.

FIG. 4 is a block diagram of the control circuit 30. The control circuit 30 includes an X-side type discrimination circuit 32 for discriminating the access type requested by the data processing unit X on the bases of the address signal, the control signal, a LONG signal outputted by the data processing unit X and a Y-side type discrimination circuit 33 for discriminating the access type requested by the data processing unit Y on the bases of the address signal, the control signal, a LONG signal outputted by the data processing unit Y.

The LONG signal indicates the condition that the data processing unit X or Y inputs or outputs data at the LONG unit. That is, 32-bit data is inputted or outputted for consecutive two clock periods.

Moreover, the control circuit 30 further includes an X-side arbitration/conversion circuit 34 for checking collision of accesses by comparing the access type discriminated by the X-side type discrimination circuit 32 with the access type discriminated by the Y-side type discrimination circuit 33, and supplying a halt request to the data processing unit X if necessary, and converting the discriminated access type from the data processing unit X into the actual access type actually used for controlling. Moreover, the control circuit 30 further includes a Y-side arbitration/conversion circuit 35 for checking collision of accesses by comparing the access type discriminated by the Y-side type discrimination circuit 33 with the access type discriminated by the Y-side type discrimination circuit 33, and supplying a halt request to the data processing unit Y if necessary, and converting the discriminated access type from the data processing unit Y into the actual access type actually used for controlling. Moreover, the control circuit 30 further includes a priority register 36 for indicting which of the data processing unit X or Y has a priority which is controlled by a switch signal.

The priority register 36 sets either of first to third priority conditions in response to the switch signal from the external, for example, generated by a dip switch. The first priority condition is that the priority is fixed to the X-side data processing unit. The second priority condition is that the priority is fixed to the Y-side data processing unit. The third priority condition is that the priority is alternately set to one of data processing unit X or Y at every occurrence of access collision.

Moreover, the control circuit 30 includes a data path control circuit 37 for generating path control signals Sx, Sy, Sa, and Sb for controlling the data path circuit 10 and a control path control circuit 38 for generating path control signals Sca and Scb for controlling the control path circuit 20. The control circuit 30 further includes a halt control circuit 39 for generating halt signals HX and HY for halting process in the data processing unit to be halted for one processing cycle (in this embodiment, one clock period) in accordance with the halt requests from the both X-side arbitration/conversion circuit 34 and 35.

Each of the X-side arbitration/conversion circuit 34 and the Y-side arbitration/conversion circuit 35 discriminates the access type into twelve actual access types as follows:

(11) If there is no access "no access".
(12) Reading (loading) from the memory unit A "A-side W reading (loading)".
(13) Reading (loading) from the memory unit B "B-side W reading (loading)".
(14) Writing (storing) in the memory unit A "A-side W storing".
(15) Writing (storing) in the memory unit B "B-side W storing".
(16) Simultaneously reading (loading) from both memory units A and B (upper bits from A side) "A-side L reading (loading)".
(17) Simultaneously reading (loading) from both memory units A and B (upper bits from B side) "B-side L reading (loading)".
(18) Reading from reading (loading) temporary registers "R reading (loading)".
(19) Writing (storing) in the storing temporary register in the A-side path unit "A-side R storing".
(20) Writing (storing) in the storing temporary register in the B-side path unit "B-side R storing".
(21) Simultaneously storing in both memory units A and B (upper bits on A side) "A-side L storing".
(22) Simultaneously storing in both memory units A and B (upper bits on B side) "B-side L storing".

The control path control circuit 38 generates the path control signals Sca and Scb for controlling the path units 21 and 22 in the control path circuit 20 in accordance with the actual access types with reference to the table in FIG. 5A.

In FIG. 5A, "X/Y" indicates generating path control signals such that if the access is requested to the selection circuit M6 by the data processing unit X, the path control signal for selecting the control bus CX is generated and if the access is requested to the selection circuit M6 by the data processing unit Y, the path control signal for selecting the control bus CY is generated That is, if the actual access request from a request source data processing unit (hereinafter referred to as request source data processing unit) is "A-side W access" (corresponding to (12) and (14)), the address and the control signals outputted from the request source data processing unit are supplied to only the memory unit B. If the actual access request from a request source data processing unit is "B-side W access" (corresponding to (13) and (15)), the address and the control signals outputted from the request source data processing unit to only memory unit B.

If the actual access request is "L accesses" ((16), (17), (21), or (22)), the address and the control signals are supplied to both memory units A and B. In other cases, ((11), (18), (19), or (20)), the address and the control signals are supplied to neither of memory units A and B.

On the other hand, the data path control circuit 37 generates the path control signals Sx, Sy, Sa, and Sb for controlling the path units 11 to 14 in the data path circuit 10 in accordance with the tables in FIGS. 5A and 5B.

In FIG. 5B, "A/B" means that the gate circuit M4 is activated and if the actual access type is "A-side one", the data path control circuit 37 generates the path control signals for activating the gate circuit M4 and for the selection circuit M3 to select the data bus DA when the actual access type is "A-side one". Moreover, the data path control circuit 37 generates the path control signals for activating the gate circuit M4 and for the selection circuit M3 to select the data bus DB when the actual access type is "B-side one". Moreover, the output "C" means that the data path control circuit 37 generates the path control signals such that the gate circuit M4 is activated and the selection circuit M3 selects the output of the reading (loading) temporary register M2.

Moreover, the output "X/Y" means that the data path control circuit 37 generates the path control signals such that the gate circuit M4 is activated, the selection circuit M3 selects the data bus DX if the access resource data processing unit is from data processing unit X, and the selection circuit M3 selects the data bus DY when the access is from data processing unit Y. The output "Z" means generating the path control signals such that the gate circuit M4 is activated and the selection circuit M3 selects the output of the storing temporary register M2.

Moreover, "A/B" in the section of "hold" means that the data supplied through the selection circuit M1 is latched in the temporary register M2 and the path control signal for selecting the data bus DA is generated when the actual type is "A-side one" and the path control signal for selecting the data bus DB is generated when the actual type is "B-side one". "X/Y" in the section of "hold" means that the data supplied through the selection circuit M1 is latched by the temporary register M2 and path control signals are generated such that the data bus DX is selected when the access is requested from the data processing unit X and the data bus DY is selected when the access is requested by the data processing unit Y.

That is, the path control signals are generated in accordance with the data in the tables in FIGS. 5A to 5C. Then, the path units 11 to 14 are controlled in response to the path control signals Sx, Sy, Sa, and Sb. Thus, if the actual access type is "A- or B-side W read", the data read from the memory unit A (or B) is directly supplied to the request source data processing unit and if the actual access type is "A- (or B-) side W storing", the storing data from the request source data processing unit is directly stored in the memory unit A (or B).

Moreover, if the actual access type is "A- (or B-) side L reading (loading)", out of the data simultaneously read from the both memory units A and B, the upper digit data from the memory unit A (or B) is directly supplied to the request source data processing unit and the lower digit data from the memory unit B (or A) is stored in the reading (loading) temporary register M2 corresponding to the request source data processing unit. If the actual access type is "R reading (loading)", the data stored in the reading (loading) temporary register M2 corresponding to the request source data processing unit is supplied to the request source data processing unit.

If the actual access type is "A- (or B-) side R storing", the data outputted by the request source data processing unit is stored in the storing temporary register M2 corresponding to the memory unit A (or B). If the access type is "A- (or B-) side L storing", the data stored in the storing temporary register M2 corresponding to the memory unit A (or B) is stored (written) as the upper digit data and the data outputted by the request source data processing unit is stored as the lower digit data in both memory units A and B at the same time.

The both of X-side and Y-side type discrimination circuits 32 and 33 discriminate the access type in accordance with the address, control signals, the LONG signals. The access types are discriminated as nine types as follows:
(1) No access to the memory units A and B "no access",
(2) reading (loading) in the word unit at an even address in the memory unit A "A-side W reading (loading)",
(3) reading (loading) in the word unit at an odd address in the memory unit B "B-side W reading (loading)",
(4) storing in the word unit at an even address in the memory unit A "A-side W storing"
(5) storing in the word unit at an even address in the memory unit B "B-side storing"
(6) first reading (loading) in the long unit "first L reading (loading)".
(7) second reading (loading) in the long unit "second L reading (loading)".
(8) first storing in the long unit "first L storing".
(9) second storing in the long unit "second L storing".

The access types (2) to (5) are classified as word access and the access types (6) to (9) are classified as long access. In the long access, top address data indicating whether the top address is an even address (memory unit A) or an odd address (memory unit B) is added to the discriminated access type data.

Each of the X-side arbitration/conversion circuit 34 and the Y-side arbitration/conversion circuit 35 executes arbitration/conversion process in accordance with the discriminated access types.

Each of the X-side arbitration/conversion circuit 34 and the Y-side arbitration/conversion circuit 35 judges whether access collision occurs on the basis of the discriminated access type requested by the corresponding side of the data processing unit and the discriminated access type requested by the opposite side of the data processing unit in accordance with a flow chart shown in FIG. 6. When there is access collision, (YES in step S110), it is judged whether the subject data processing unit has a priority over the opposite side of data processing unit with reference to the priority register 36 in accordance with the collision judging table in FIG. 7A

If there is no access collision (NO in S110), or there is access collision (YES in S110) but the subject data processing unit has a priority (YES in S120), the access type conversion processing is executed in step S130 in accordance with the type conversion table shown in FIG. 7B. On the other hand, the subject data processing unit has no priority (NO in S120), a halt request for halting the subject data processing unit is supplied to the halt control circuit 39 and the discriminated access type is converted into the actual access type of no accessing, and processing ends.

In the type conversion processing, when the discriminated access type is the word access, the type conversion is substantially not executed but executed only when the discriminated access type is the long unit as follows:

In the long access reading (loading), at the first processing period (first clock period), data is simultaneously read from the memory units A and B, and the upper bit data is directly supplied to the access source data processing unit X or Y. The lower bit data is stored in the reading (loading) temporary register M2 corresponding to (on the side of) the request source data processing unit. At the second processing period (clock period), the lower bit data stored in the reading (loading) temporary register is supplied to the request source data processing unit X or Y.

To provide this operation, the type conversion table shown in FIG. 7A converts the discriminated access type "first L reading (loading)" into actual access type of "A-side L reading (loading)" or "B-side L reading (loading)" in accordance with the top address data and converts discriminated access type "second L reading (loading)" into actual access type "R reading (loading)".

In the long unit storing, at the first processing period, the upper bit data is stored in the storing temporary register for the memory unit A or B that is requested, and at the second processing period, the upper data in the storing temporary register and the lower bit data outputted from the access request source data processing unit is simultaneously stored in both memory units A and B.

To provide this operation, the type conversion table converts the discriminated access type of "first L storing" into actual access type "A-side R storing" or "actual access type "B-side R storing" in accordance with the top address data. Moreover, the type conversion table converts the discriminated access type "second L storing" into actual access type "A-side L storing" or "B-side L storing" in accordance with the top address data.

The access type is converted as mentioned above, so that in the case of the access in the long unit, access to the memory units A and B is made only once out of two processing periods, that is, at only the first processing period for reading (loading) and at only the second processing period for storing.

As the result, the relation of access types is defined as shown in the collision judging table shown in FIG. 7A.

In the collision judging table, if both discriminated access types are "first L storing", in fact, there is no access collision at the first processing period because the actual accessing is not executed. However, because access collision will always occur at the second L storing, the collision judgment is made at the first L wiring to avoid the access collision at the second L storing. However, it is also possible that access collision is not judged at the first L storing, but judges the access collision at "second L storing".

Moreover, if the discriminated access type is "second L reading (loading)", no access collision will occur irrespective of the access type of the other side data processing unit. So this discriminated access can be directly converted into actual access type "R reading (loading)" with the flow chart shown in FIG. 6 being neglected.

The data path circuit 10, the control path circuit 20, the data path control circuit 37, the control path control circuit 38 correspond to the usual reading (loading) means, the simultaneously reading (loading) means, a buffer reading (loading) means, the usual storing means, the buffer storing means, and the simultaneously storing means.

Particularly, the portion generating the path control signals in response to the actual access types of "A-side W reading (loading)" and "B-side W reading (loading)" corresponds to the usual reading (loading) means. The portion converting the discriminated access type of "first L reading (loading)" into the actual access type of "A-side L reading (loading) or "B-side L reading (loading)" and generating the path control signals in accordance with the converted actual access types corresponds to the simultaneously reading (loading) means. The portion converting the discriminated access type of "second L reading (loading)" into the actual access type of "R reading (loading)" and generating the path control signals in accordance with the converted actual access type corresponds to the buffer reading (loading) means.

The portion generating the path control signal in accordance with the actual access types of "A-side W storing" and "B-side W storing" corresponds to the usual storing means. The portion converting the discriminated access type of "first L storing" into the actual access type of "A-side R storing" or "B-side R storing" and generating the path control signal in accordance with the converted access type corresponds to the buffer storing means. The portion converting the discriminated access type of "second L storing" into the actual access type of "A-side L storing" or "B-side L storing" and generates the path control signal in accordance with the converted access type corresponds to the simultaneously storing means.

FIGS. 8A to 8T are time charts showing operations in the control unit U and FIGS. 9A to 9G are illustrations showing accessing operations according to the first embodiment.

The accessing operation will be described more specifically with reference to FIGS. 8A to 8T and FIGS. 9A to 9G. Here, it is assumed that the priority register 36 is set to the mode that every occurrence of access collision alters the data processing unit having the priority between the data processing units A and B.

In the Case that Both Accesses are in the Word Unit (Access Collision)

When the data processing unit X requests to read data at an even address (A0) at the word unit (WR), and the data processing unit Y requests to store data at an even address (A20) at the word unit, access collision occurs at timing of CK0 at which both discriminated accesses are the access type "A-side W reading (loading)"/"A-side W storing" (=the discriminated access type in the data processing unit X/the discriminated access type in the data processing unit Y) That is, two accesses to the same memory unit A occur at the same time.

Figure 9A:
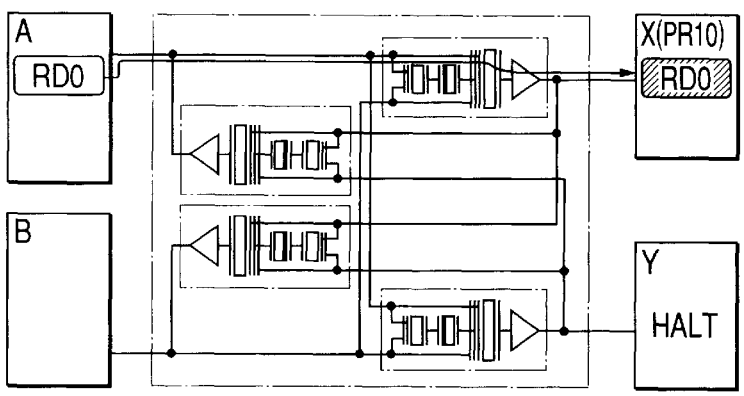
FIGS. 9A to 9G are illustrations of accessing operations according to the first embodiment.

In this case, the data processing unit X has the priority, so that the control unit U makes the halt signal HY active to halt the data processing unit Y and allows the data processing unit X to access to the memory unit A as shown in FIG. 9A.

In the Case that Both Accesses are in the Word Unit (No Collision)

Figure 9B:
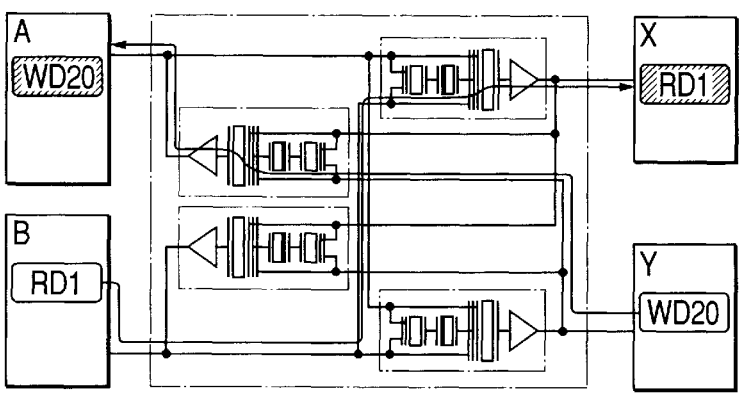

At the following clock period CK1, the data processing unit X requests to read data at an odd address (A1) at the word unit (WR), and the data processing unit Y which has been released from halting in accordance with the halt signal HY requests the previously requested access, the discriminated access types are "B-side W reading (loading)"/"A-side W storing", respectively. That is, word accesses to different memory units are made, so that there is no access collision. So the control unit U allows the data processing unit X to access to the memory unit B and the data processing unit Y to access to the memory unit A at the same time as shown in FIG. 9B.

In the Case that Both Accesses are in the Long Unit (No Collision)

Figure 9C:
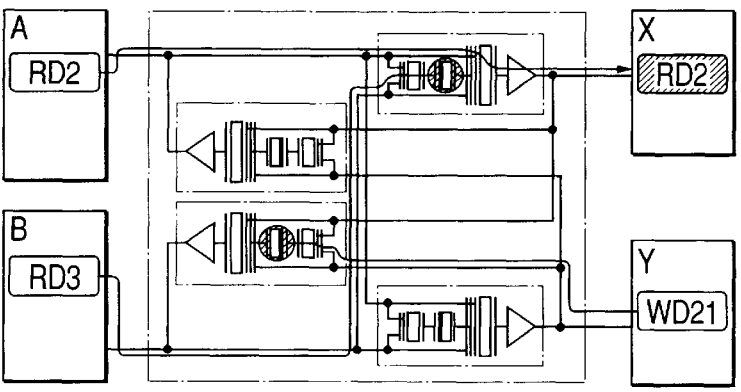

When the data processing unit X requests to read top data at even address A2 at the long unit (LR1) and the data processing unit Y requests to store top data at an odd address A21 at the long unit (LW1), the access conditions are "first L reading (loading)"/"first L storing" at timing of clock CK2. Both actual access types are converted into "A-side L reading (loading)"/"A-side R storing". The control unit U supplies the control signals from the data processing unit X to both memory units A and B. As the result, the memory unit A supplies the read data RD2 to the data bus DX and the data RD3 read from the memory unit B is stored in the reading (loading) temporary register in the X-side loading data path unit 11 At the same time, storing data WD21 to be stored at address A21 outputted by the data processing unit Y is stored in the storing temporary register in the B-side storing path unit 14 as shown in FIG. 9C.

Figure 9D:
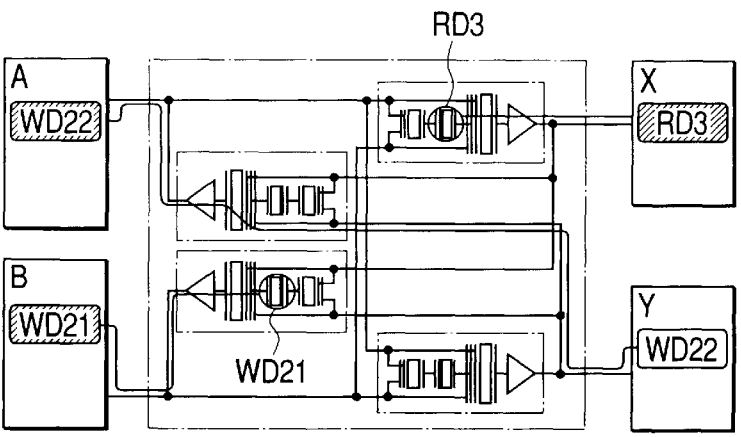

At the following clock period CK3, the access conditions become "second L reading (loading)"/"second L storing". These are converted into actual access types of "R reading (loading)"/"A-side L storing". The control unit U supplies the data RD3 stored in the X-side reading (loading) temporary register at clock period CK2 to the data bus DX in accordance with the actual access type. At the same time, the control unit U supplies the control signals from the data processing unit Y to the memory units A and B. In response to this, the storing data WD21 stored in the B-side storing temporary register at the previous timing is stored in the memory unit B and the storing data WD22 at address A 22 outputted by the data processing unit Y as shown in FIG. 9D.

That is, if the reading (loading) request and the storing request at the long unit occur at the same time, no collision occurs at both first and second clock periods.

In the Case that Both Accesses are in the Long Unit (Collision)

Figure 9E:
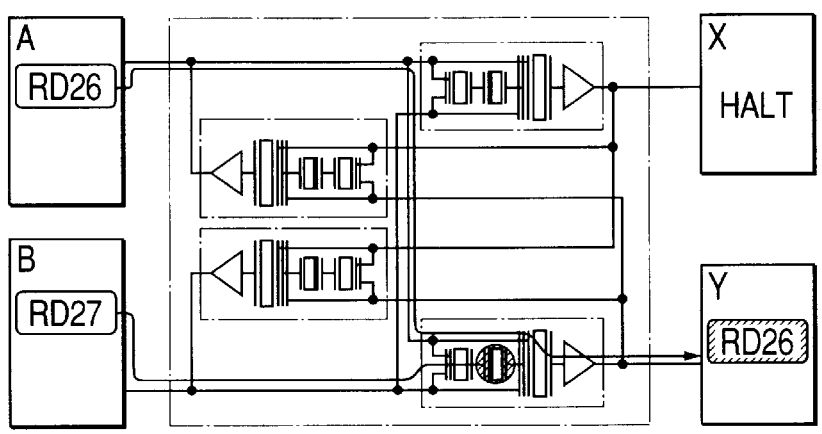

If the data processing unit X requests to read data at an even address A4 as top address at the long unit and the data processing unit Y requests to read data at an even address A26 as the top address at the long unit, collision occurs because discriminated access types become "first L reading (loading)" (top address data is on the A-side) at the clock period CK4. In this condition, the priority is provided to the data processing unit Y, so that the control unit U halts the data processing unit X by making the halt signal HX active and as well as the control unit U converts both discriminated access types into actual access types of "no access"/"A-side L reading (loading)". The control unit U supplies the control signals from the data processing unit Y to the memory units A and B in accordance with the actual access type. As the result, the control unit U supplies the data RD26 read from the memory unit A to the data bus DY and as well as supplies the data RD27 read from the memory unit B to the reading (loading) temporary register in the Y-side loading data path unit 12 as shown in FIG. 9E.

Figure 9F:
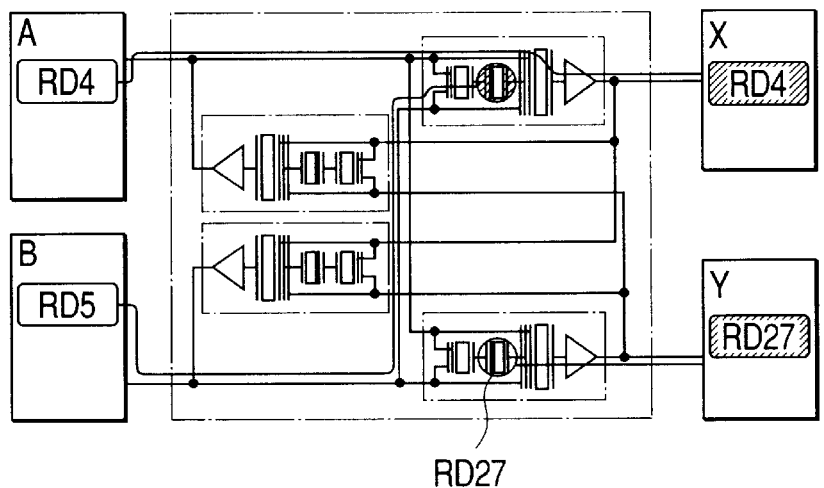

At the following clock period CK5, the data processing unit X that has been released from the halt signal HX requests the previous access again and the data processing unit Y requests the process followed by the previous process. Thus, both accesses types become "first L reading (loading)"/"second L reading (loading)" and are converted into actual access types of "A-side L reading (loading)"/"R reading (loading)". The control unit U supplies the control signals from the data processing unit X to the memory units A and B. As the result, the data RD4 read from the memory unit A is supplied to the data bus DX and as well as the data RD5 read from the memory unit B is stored in the reading (loading) temporary register in the X-side loading data path unit 11. At the same time, the control unit U supplies the data RD27 stored in the reading (loading) register in the Y-side loading data path unit 12 to the data bus DY as shown in FIG. 9F.

Figure 9G:
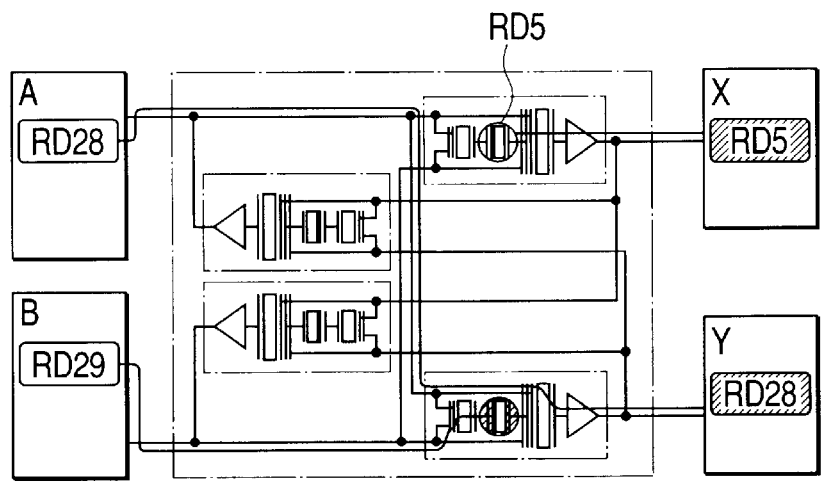

Moreover, at the clock period CK6, the data processing unit X requests the process followed by the previous process and the data processing unit Y newly requests to read data at an even address A28 as top address at the long unit, so that both discriminated access types become "second L reading (loading)"/"first L reading (loading)". This condition is the same as that at the previous clock period CK5 because only the access types are exchanged between the data processing units X and Y. Thus, the control unit U operates in the same manner in accordance with the access type without collision as shown in FIG. 9G.

That is, collision occurs only when both data processing units X and Y read data at the long unit and the first processes (first L reading (loading)) occur at the same time. Therefore, if both data processing units X and Y successively request to read data at the long unit, the first requests may develop collision. However, after this, one of data processing units X and Y processes the first process (first L reading (loading)) and the other processing unit executes the second process (second L reading (loading)), so that collision does not occur.

As mentioned, a portion of combinations of access is made with reference to FIGS. 8A to 8T. In other cases, processing is executed in accordance with the following rule.

If discriminated access type of the subject data processing unit is either of "second L reading (loading)" or "first L storing", the subject data processing unit does not access to the memory units A and B, so that no collision occurs even though the other data processing unit requests any access. Moreover, if discriminated access type of the subject data processing unit is either of "first L reading (loading)" or "second L storing", the control unit U simultaneously accesses to both memory units A and B. Thus, collision will always occur except that the discriminated access is "second L reading (loading)", "first L storing", or "no access".

As described above, when the data processing units X and Y request access at the long unit, the control unit U inputs and outputs data between the data processing units X and Y and the control unit U with two divided process at the word unit. On the other hand, between the memory units A and B and the control unit U, data is inputted from both memory units A and B or outputted from both memory units A and B simultaneously for one clock period at the long unit (at first processing period for reading (loading) request and second processing period for storing request).

Thus, the number of accessing per unit interval by the data processing units X and Y is reduced to half. That is, the possibility of occurrence of collision can be reduced, so that the efficiency in processing can be improved.

Thus, the number of accesses per unit interval by the data processing units X and Y is reduced to half. That is, the possibility of occurrence of collision can be reduced, so that the efficiency in processing can be improved.

[Second Embodiment]

An access control unit according to a second embodiment has substantially the same structure as that of the first embodiment. The difference is that the control unit U has a data path circuit 10a in which the A-side storing path unit 13 and the B-side storing path unit 14 are omitted and a control circuit 30a further includes an X-side pre-loading judging circuit 40 and a Y-side pre-loading judging circuit 41. Thus, the difference portion is mainly described.

Figure 10A:
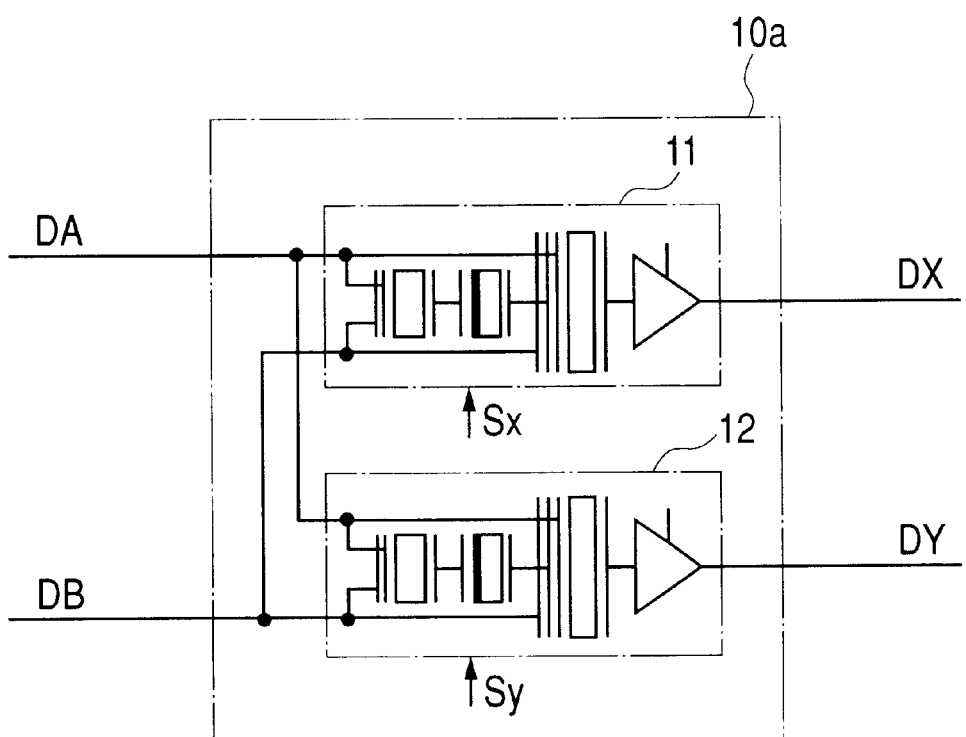
FIG. 10A is a block diagram of the data path unit in the control unit according to the second embodiment.

FIG. 10A is a block diagram of the data path circuit 10a in the control unit U according to the second embodiment. FIG. 10B is a block diagram of the control unit 30a in the control unit U according to the second embodiment.

The data path circuit 10a only includes the X-side loading data path unit 11 and the Y-side loading data path unit 12.

Thus, in the second embodiment, the discriminated accesses are classified into the following six actual access type (access types (14), (15), (19)–(22) are omitted)

(11) If there is no access "no access".
(12) Reading (loading) from the memory unit A "A-side W reading (loading)".
(13) Reading (loading) from the memory unit B "B-side W reading (loading)".
(16) Simultaneously reading (loading) from both memory units A and B (upper bits from A side) "A-side L reading (loading)".
(17) Simultaneously reading (loading) from both memory units A and B (upper bits from B side) "B-side L reading (loading)".
(18) Reading from reading (loading) temporary registers "R reading (loading)".

Moreover, the control circuit 30a generates only the path control signal Sx for the X-side loading data path unit 11 and the path control signal Sy for the Y-side loading data path unit 12 in accordance with the table shown in FIG. 5B.

Moreover, the control circuit 30a includes the X-side pre-loading judging circuit 40 including an address register for storing the next address obtained by adding one to the address from the data processing unit X in response to an address latch signal from the X-side arbitration/conversion circuit 34. When the data stored in the address register agrees with the address from the data processing unit X, the X-side pre-loading judging circuit 40 informs the X-side arbitration/conversion circuit 34 of the agreement by making a pre-loading signal active.

Further, the control circuit 30a includes the Y-side pre-loading judging circuit 41 including an address register for storing the next address obtained by adding one to the address from the data processing unit Y in response to an address latch signal from the X-side arbitration/conversion circuit 35. When the data stored in the address register agrees with the address from the data processing unit Y, the Y-side pre-loading judging circuit 41 informs the Y-side arbitration/conversion circuit 35 of the agreement by making an pre-loading signal active.

Both arbitration/conversion circuits 34 and 35 execute the arbitration/conversion process in the same manner as the first embodiment as shown by the flow chart in FIG. 6. Here, the judgment of collision in step S110 is made with a collision judgment table as shown in FIG. 10C and the access type conversion process in step S130 is executed with a type conversion table shown in FIG. 11A.

The both type discrimination circuits 32 and 33 discriminate access for reading (loading) data in the memory units A and B into seven discriminated access types as follows:
(1) "No access",
(2a) "A-side W reading (loading) without pre-loading",
(2b) "A-side W reading (loading) with pre-loading",
(3a) "B-side W reading (loading) without pre-loading",
(3b) "B-side W reading (loading) with pre-loading",
(6) "first L reading (loading)".
(7) "second L reading (loading)".

In the type conversion process, if the access type is of long unit, access to the memory units A and B is made in the same manner as the first embodiment. If the access type is of the word access, the type conversion process is made to provide access to the memory units A and B in the manner as follows:

If the subject data processing unit makes the word access and the opposite side data processing unit does not execute access to the memory units A and B, the control unit U reads the data from one of the memory units indicated by the access request and reads the data at the next address from the other memory unit and stores the data at the next address in the reading temporary register as the pre-loading data. Moreover, the control unit U stores the address of the pre-loading data stored in the reading temporary register in the address register. Next, when there is access request for reading the data stored at the address stored in the address register, the control unit U supplies the pre-loading data to the access request source data processing unit without access to the memory units.

Figures 11A, 11B:
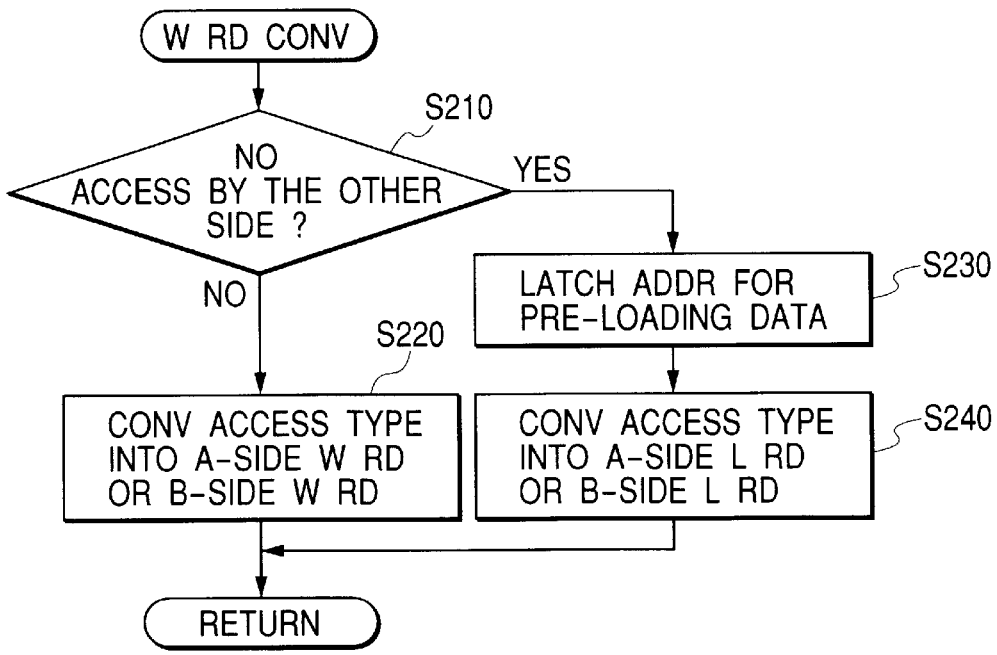
FIG. 11A is a table of type conversion according to the second embodiment.
FIG. 11B depicts a flow chart showing type conversion operation according to the second embodiment.

To provide this operation, the type conversion table shown in FIG. 11A converts discriminated access types "A-side W reading with pre-loading" and "B-side W reading with pre-loading" into actual access types "R reading". In addition, the conversion table converts discriminated access type of "A-side W reading without pre-loading" into actual access type of "A-side W reading" or "A-side L reading" and converts discriminated access type of "B-side W reading without pre-loading" into actual access type of "B-side W reading" or "B-side L reading" in accordance with the flow chart shown in FIG. 11B.

In the case of discriminated access type "A-side W reading without pre-loading" or "B-side W reading without pre-loading", as shown in FIG. 11B, the control unit U judges whether the discriminated access type of the other side of data processing unit is any of "No access", "A-side W reading with pre-loading", "B-side W reading with pre-loading", or "second L reading" or not in step S210. If No, processing proceeds to step S220. In step S220, in the case of "A-side W reading without pre-loading", the control unit U converts the discriminated access into actual access type "A-side W reading". In step S220, in the case of "B-side W reading without pre-loading, the control unit U converts the discriminated access into actual access type "B-side W reading".

In step S210, if the discriminated access type of the other side of data processing unit is any of "No access", "A-side W reading with pre-loading", "B-side W reading with pre-loading", or "second L reading", the control unit U stores the reading source address of the pre-loading data in the address register in the pre-loading judging circuit 40 or 41 on the side of the subject data processing unit in step S230 because the other side of data processing unit does not access to memory units, so that pre-loading data is possible. At the same time, the control unit U converts the discriminated access into actual access type "A-side L reading" in the case of "A-side W reading without pre-loading and into "B-side L reading in the case of "B-side W reading without pre-loading in step S240.

As mentioned above, the discriminated access type is converted and if pre-loading of data is possible, the pre-loading is executed. Thus, though one data processing unit effects word accessing to a memory unit, and at the same time, the other data processing unit accesses to the same memory unit, the pre-loading prevents access collision.

Accordingly, the collision relation of access types are shown in the collision judging table shown in FIG. 10C. Here, in the case of "W reading with pre-loading", as same as "second L reading", collision does not occur irrespective of the access type of the other side of data processing unit, so that it is possible to directly convert it into "R reading" irrespective of the flow shown in FIG. 6.

In this embodiment, the portion converting the discriminated access type "A-side W reading without pre-loading" or "B-side W reading without pre-loading" into the actual access type "A-side L reading" or "B-side L reading" and generating the corresponding path control signals corresponds to a data pre-loading means. Moreover, the discriminated access type "A-side W reading with pre-loading" or "B-side W reading with pre-loading" into "R reading" and the corresponding path control signals is an advance data supplying means.

Operation of the control unit U having the structure as mentioned above will be described with reference to a time chart shown in FIGS. 12A to 12T.

Figure 13A:
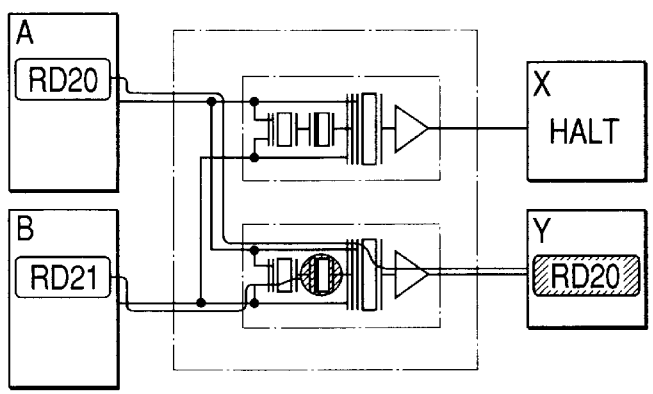
FIGS. 13A to 13D are illustrations of accessing operations according to the second embodiment.

At the timing of the clock CK1, that is, when both discriminated access types of the data processing units X and Y are "A-side W reading without pre-loading", there is collision because there is access to the same memory unit A. In this case, the data processing unit Y has priority, so that the control unit U halts the data processing unit X by making the halt signal active as well as converts the both discriminated access types into actual access types "No access"/"A-side L reading", respectively. In the case of this access types, the control unit U supplies the control signals from the data processing unit Y to both memory units A and B. Next, the control unit U supplies the data RD20 read from the memory unit A to the data bus DY and as well as stores the data RD21 read from the memory unit B in the reading temporary register in the Y-side loading data path unit 12 as pre-loading data and stores address A21 of the pre-loading data into an address register in the Y-side pre-loading judging circuit 41 as shown in FIG. 13A.

Figure 13B:
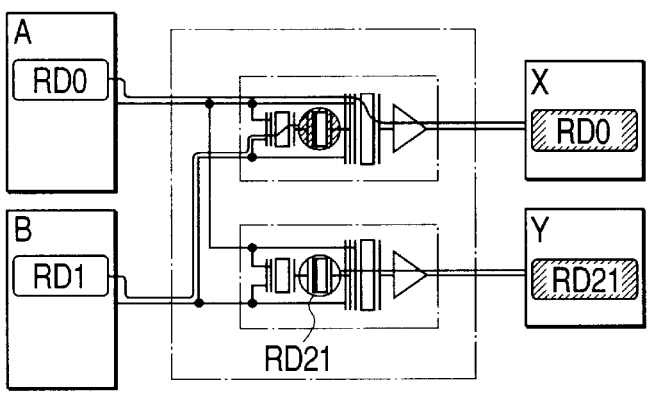

At the following clock timing CK2, the data processing unit X, which has been released from the halt signal HX, sends the previous access request, and the data processing unit Y sends word access request at the next address. Then, both discriminated access types are "A-side W reading without pre-loading"/"B-side W reading with pre-loading". In this case, the data processing unit Y does not access to the memory units A and B, so that the discriminated access types are converted into actual access types "A-side L reading"/"R reading". The control unit U supplies the control signals from the data processing unit X to the memory units A and B in accordance wit these actual access types. As the result, the control unit U supplies the data RD0 read from the memory unit A to the data bus DX and stores the data RD1 read from the memory unit B as advance data in the reading temporary register in the X-side loading data path unit 11 and stores address A1 of the pre-loading data in the address register in the X-side pre-loading judging circuit 40. At the same time, the data RD21 previously stored in the reading temporary register in the Y loading data path unit 12 is supplied to the data bus DY as shown in FIG. 13B.

Figure 13C:
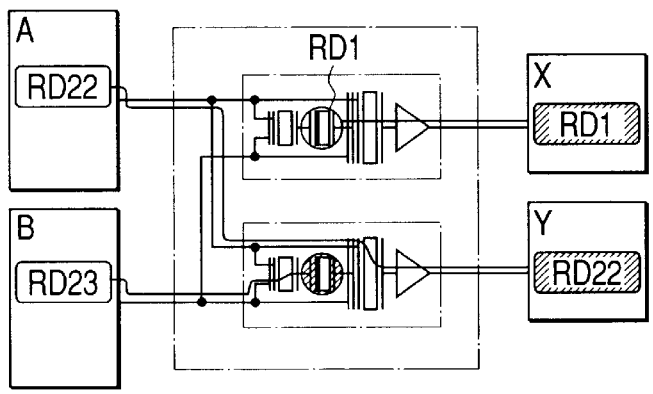

At clock timing CK3 at which both discriminated access types become "B-side W reading with pre-loading"/"A-side W reading without pre-loading, there is no collision because the access types of the data processing units X and Y are the same as those at the clock timing CK2 but only the access types of the data processing units X and Y are only exchanged with each other Thus, the control unit U similarly operates for each access type as shown in FIG. 13C.

Figure 13D:
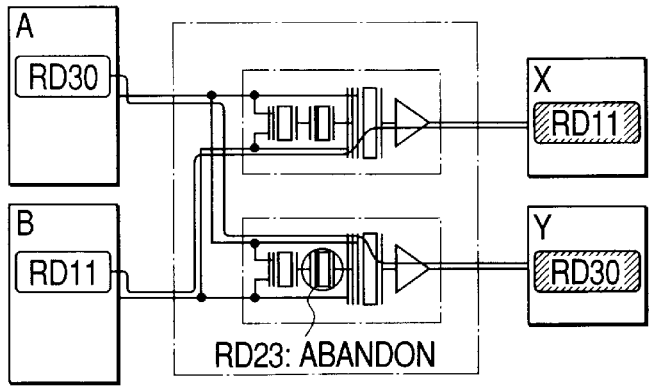

At clock timing CK4 at which the data processing unit Y requests word accessing to an even address A30 which is different from the pre-loading address previously stored in the address register, the access type of the data processing unit Y is "A-side W reading without pre-loading" and the pre-loading data RD 23 in the Y-side reading temporary register is abandoned. At this timing, though both data processing units X and Y are in the word accessing without pre-loading conditions, there is no collision dissimilar to the condition at the clock timing Ck1 because of accesses to different memory units. Thus, the discriminated access types are converted into actual access types "B-side W access"/ "A-side W access" as shown in FIG. 13D.

As mentioned above, in this embodiment, if the subject side data processing unit requests to access at the word unit, and the other side does not access to the memory units A and B, the data is read in accordance with the access request and at the same time, the data at the next address is previously read and stored in the pre-loading temporary register. If the address of the following access request agrees with the address of the pre-loading, the pre-loading data is read from the reading temporary register without access to the memory units A and B.

Thus, if there is pre-loading data at the word accessing, no access collision occurs though the other side requests any type of accessing. This operation can further reduce the possibility of access collision between both data processing units than that according to the first embodiment. Accordingly, the processing efficiency can be further improved.

[Third Embodiment]

Figure 14A:
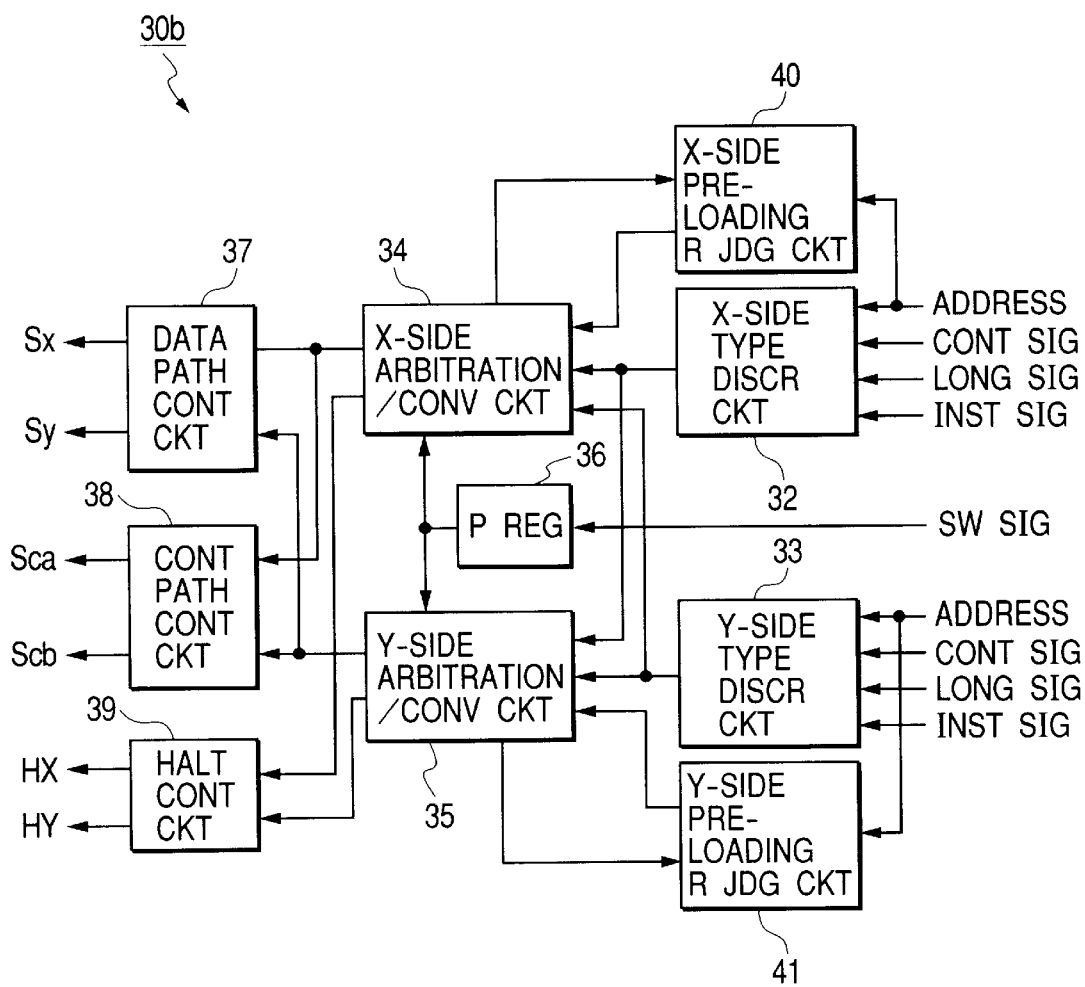
FIG. 14A is a block diagram of a control circuit according to a third embodiment.

The access control unit according to a third embodiment has substantially the same structure as that of the second embodiment. The difference is in the access type discrimination circuits 32 and 33 and the arbitration/conversion circuits 34 and 35. Thus, this portion will be mainly described FIG. 14A is a block diagram of a control circuit 30b according to the third embodiment. In the control circuit 30b, the type discrimination circuits 32 and 33 are supplied with instruction signals in addition to the address, the control signals, and the LONG signals The instruction signal indicates whether the reading instruction in the control signal is for reading instruction or for reading data other than the instruction.

The data in the instruction signal is added to the discriminated access types "A-side W reading without pre-loading" or "B-side W reading without pre-loading" and is used in the both arbitration/conversion circuits 34 and 35 during conversion the discriminated access types into the actual access types.

Figure 14B:
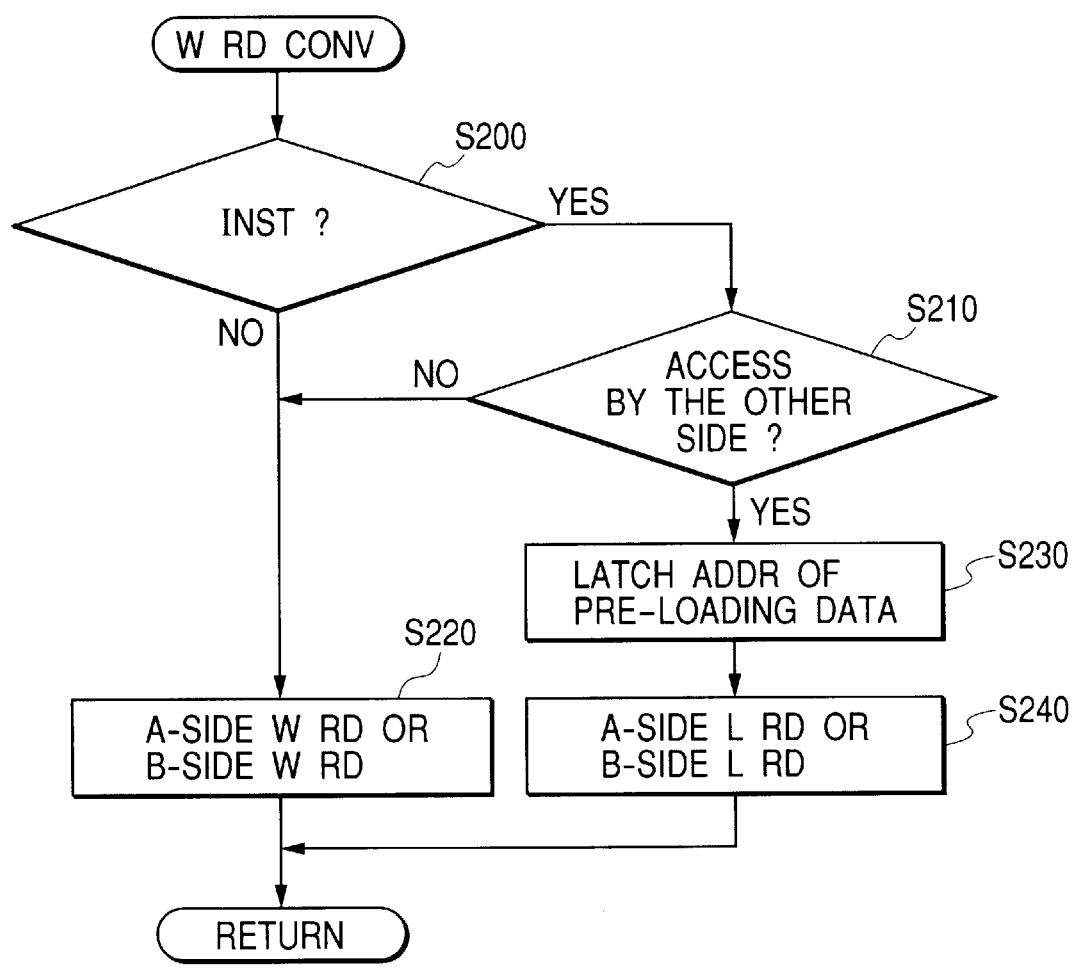
FIG. 14B depicts a flow chart of conversion operation according to the third embodiment.
Figure 15:
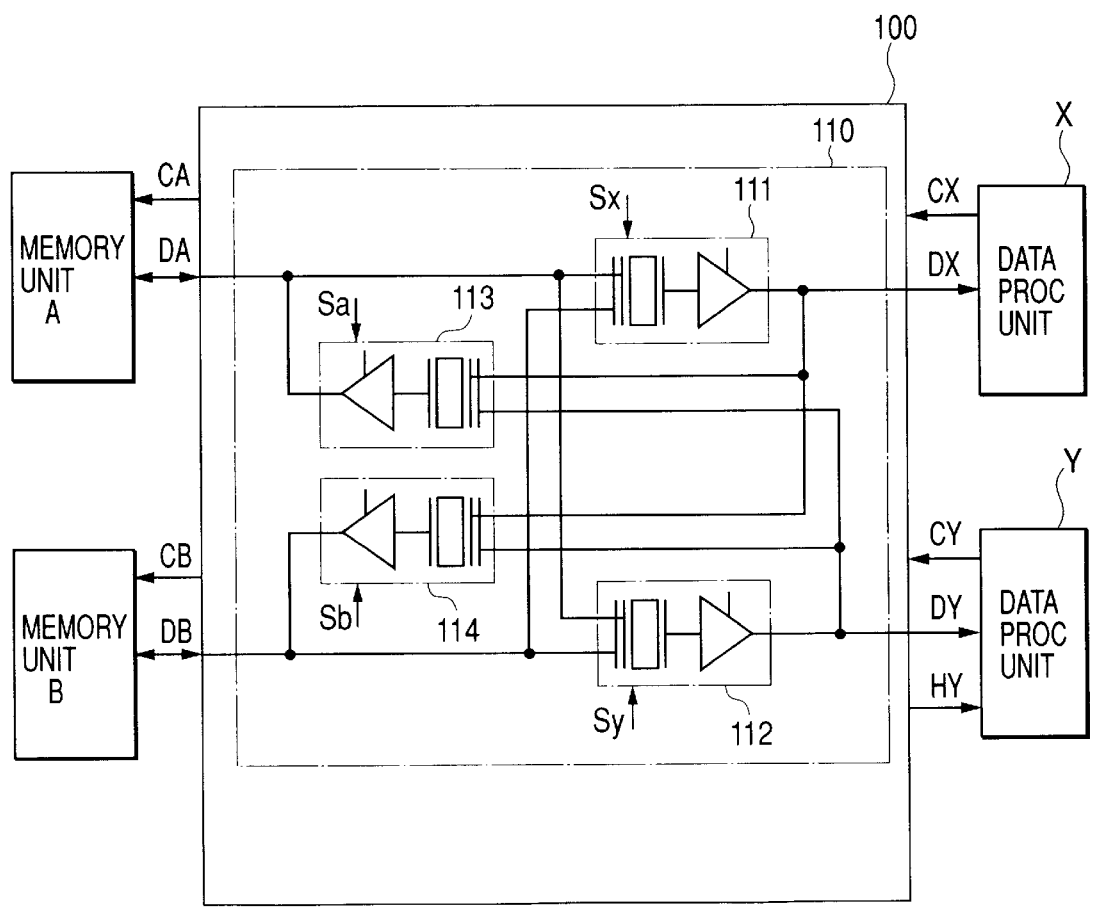
FIG. 15 is a block diagram of a prior art access controlling unit.
Figures 16A, 16B:
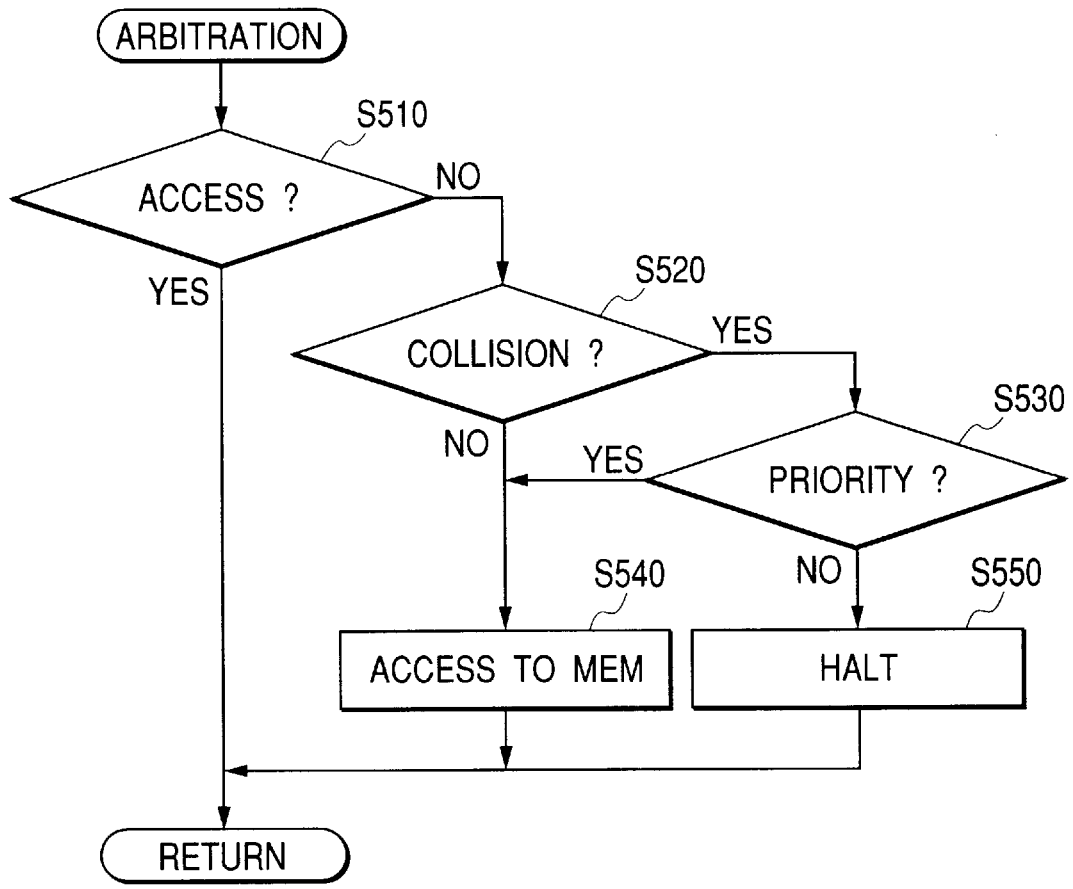
FIG. 16A depicts a flow chart for arbitration of accesses in a prior art.
FIG. 16B is a table for judging access collision in the prior art.

Each of the arbitration/conversion circuits 34 and 35 executes the arbitration/conversion process with the collision judging table shown in FIG. 10B and the type conversion table shown in FIG. 11A. Here, if the discriminated access type is "A-side W reading without pre-loading" or "B-side W reading without pre-loading", processing is executed with the flow chart shown in FIG. 14B instead the flow chart shown in FIG. 11B.

As shown in FIG. 14A, the control circuit 30b judges whether the added data of the instruction signal indicates reading an instruction. If the data does not indicate reading an instruction (NO in step S200), it is judged not to execute the pre-loading. Thus, the discriminated access type is converted into "A-side W reading (loading)" in the case of "A-side W reading without pre-loading and "B-side W reading (loading)" in the case of "B-side W reading without pre-loading" in step S220.

On the other hand, if the data indicates reading an instruction (YES in step S200), the processing from step S210 to S240 is executed similarly to the second embodiment.

In this embodiment, processing in steps S200 and S220 corresponds to an pre-loading inhibiting means.

In the control unit U having the structure as mentioned above, when the subject data processing unit side requests the word accessing and the other side does not request to access to the memory units A and B, similarly to the second embodiment, basically the pre-loading of data is executed. However, if the data to be read is other than instruction, the pre-loading of data is inhibited.

This is because it is frequent that instructions are successively read at the address following to the just before instruction data so that the pre-loading data is frequently used. However, there is tendency that data other than instruction is discontinuously read irrespective of the just before address so that the possibility of abandon of the advance-read data is high.

Accordingly, this embodiment can reduce occasions of unused pre-load data in addition of the advantage effects provided in the first and second embodiments. Thus, useless power consumption is prevented.

As mentioned above, the present invention has been described with first to third embodiments but the present invention is not limited to the first to third embodiments and thus, there are various modifications.

For example, in the above-mentioned embodiments, the description was made with assumption that the big endian is adopted for the data arrangement in the memory units. However, little endian can be also used for the data arrangement though there is difference in connection between the control unit U and the memory units A and B.

Moreover, in the above-mentioned embodiments, the access at the long unit is made with assumption that the top address of the data is an odd address. However, it is also possible that the top address may be always an event address. In this case, particularly in the first embodiment, the storing temporary register M2 in the B-side storing path unit 14 is not used so that this can be omitted.

What is claimed is:

1. A method of controlling access to a memory device commonly shared by a plurality of data processing units, said memory device including $2^M$ memory units (M being a natural number) which are independently controllable and have the same data bus width as said data processing units, comprising:

assigning addresses to each of said memory units such that addresses in each of said memory units changes in the same manner as other memory units and corresponding addresses in said data processing unit vary in accordance with arrangement of said memory units in said memory device;

when one of said data processing units requests to read data in said memory device at a data size which is $2^k$ times said data bus width ($1 \leq k \leq M$ and k being a natural number), reading said data from the corresponding $2^k$ memory units at the same time; and independently supplying data from each of said corresponding $2^k$ memory units to said one of said data processing units;

when said one of said data processing units requests to read desired data at a desired address from one of said memory units at a data size which is $2^P$ times said data width ($0 \leq p \leq M-1$ and p being a natural number), and if no other data processing unit requests access to said memory device, reading said desired data and, at the same time, reading other data from another memory unit other than said one of said memory units at an address following said desired address;

storing said other data in a temporary register as pre-loading data; and supplying said other data from said temporary register to said one of said data processing units after supplying said desired data to said one of said data processing units when said one of said data processing units requests to read said other data at said address following said desired address, wherein when said desired data is other than an instruction for executing a predetermined process in said one of said data processing units, inhibiting reading of said another data.

2. An access control unit coupled to a plurality of data processing units and a memory device including $2^M$ memory units which are independently controllable and have the same data bus width as said data processing units (M being a natural number), for controlling access from said data processing units to said memory device, addresses in each of said memory units being defined such that said addresses in each of said memory units change in a same manner as other memory units and corresponding addresses in said memory units vary in accordance with arrangement of said memory units in said memory device, said access control unit comprising:

temporary registers provided for each of said data processing units for temporarily storing data read from said memory device;

usual reading means responsive to a reading request for reading said data at an address indicated by said reading request and supplying said data to one of said data processing units sending said reading request;

simultaneous reading means for, when said reading request is for reading said data at a data size which is $2^k$ times said data bus width ($1 \leq k \leq M$ and k being a natural number), reading said data at addresses following said address from the corresponding ($2^k-1$) memory units at the same time as said usual reading means reads said data and storing said data from said addresses following said address in said temporary registers; and buffer reading means for successively supplying said data from said temporary registers to said one of said data processing units in response to subsequent reading requests successively made ($2^k-1$) times after said reading request;

pre-loading means for, when said one of said data processing units requests access for reading desired data at a desired address, at a data size which is $2^p$ times said data bus width ($0 \leq p \leq M-1$ and p being a natural number), and if any other data processing unit does not request access to said memory device, reading other data at an address following said desired address from another memory unit other than said one of said memory units and storing said other data in said temporary register as pre-loading data;

a pre-loading address register for storing a top address of said pre-loading data;

pre-loading data supplying means for supplying said other data from said temporary register to said one of said data processing units after supplying said desired data to said one of said data processing units, when said one of said data processing units requests access to said another memory unit for a subsequent reading with an address agreeing with said top address; and pre-loading inhibiting means for discriminating a type of said access requested by said one of said data processing units and inhibiting reading of said other data when said access is a type other than an instruction for executing a predetermined process in said one of said data processing units.

3. An access control unit, coupled to a plurality of data processing units and a memory device including $2^M$ memory units which are independently controllable and have the same data bus width as said data processing units (M being a natural number), for controlling access from said data processing units to said memory device, addresses in each of said memory units being defined such that said addresses in each of said memory units change in a same manner as other memory units and corresponding addresses in said memory units vary in accordance with arrangement of said memory units in said memory device, said access control unit comprising:

temporary registers provided for each of said data processing units for temporarily storing data read from said memory device;

usual reading means responsive to a reading request for reading said data at an address indicated by said reading request and supplying said data to one of said data processing units sending said reading request;

simultaneous reading means for, when said reading request is for reading said data at a data size which is $2^k$ times said data bus width ($1 \leq k \leq M$ and k being a natural number), reading said data at addresses following said address from the corresponding ($2^k-1$) memory units at the same time as said usual reading means reads said data and storing said data from said addresses following said address in said temporary registers;

buffer reading means for successively supplying said data from said temporary registers to said one of said data processing units in response to subsequent reading requests successively made ($2^k-1$) times after said reading request;

temporary storage registers, each being provided to said memory units for temporarily storing said data in each of said memory units;

usual storing means responsive to a storing request from one of said data processing units for directly supplying said data outputted from said one of said data processing units to one of said memory units indicated by said storing request;

buffer storing means for, when said storing request as a first successive storing request is for requesting storing data at a bit size which is $2^k$ times said data bus width ($1 \leq k \leq M$ and k being a natural number), storing first to $(2^k-1)^{th}$ divided data out of said data in response to said first successive storing request to $(2^k-1)^{th}$ successive storing requests; and simultaneous storing means for, after said divided data has been stored in said temporary storage registers by said buffer storing means, storing said divided data outputted from said one of said data processing units in the corresponding $2^k$ memory units together with said first to $(2^k-1)^{th}$ divided data stored in said storing temporary storage registers in response to said $(2^k)^{th}$ successive storing request.

* * * * *